United States Patent
Fukuda

(10) Patent No.: US 6,726,586 B2
(45) Date of Patent: Apr. 27, 2004

(54) MOTORIZED BICYCLE ACTUATOR ASSEMBLY

(75) Inventor: Masahiko Fukuda, Amagasaki (JP)

(73) Assignee: Shimano Inc., Osaka (JP)

( * ) Notice: Subject to any disclaimer, the term of this patent is extended or adjusted under 35 U.S.C. 154(b) by 44 days.

(21) Appl. No.: 09/986,766

(22) Filed: Nov. 9, 2001

(65) Prior Publication Data

US 2003/0092519 A1 May 15, 2003

(51) Int. Cl.⁷ .............................................. F16H 59/00
(52) U.S. Cl. ............................. 474/70; 474/78; 474/80
(58) Field of Search ............................. 474/70, 78, 80, 474/82, 81; 280/236, 238; 74/405, 625, 411, 410, 664

(56) References Cited

U.S. PATENT DOCUMENTS

| | | | | |
|---|---|---|---|---|
| 3,548,672 A | * | 12/1970 | Conrad | 74/405 |
| 3,919,891 A | * | 11/1975 | Stuhlmuller et al. | 474/70 |
| 4,065,983 A | * | 1/1978 | Mimura | 74/625 |
| 4,339,962 A | * | 7/1982 | Babel | 74/335 |
| 4,605,240 A | * | 8/1986 | Clem et al. | 280/236 |
| 4,929,024 A | * | 5/1990 | Secord | 297/362 |
| 5,514,041 A | * | 5/1996 | Hsu | 474/78 |
| 5,873,283 A | * | 2/1999 | Chen et al. | 74/473.12 |
| 6,047,230 A | * | 4/2000 | Spencer et al. | 474/70 |
| 6,318,199 B1 | * | 11/2001 | Buck | 74/410 |

FOREIGN PATENT DOCUMENTS

| | | | | |
|---|---|---|---|---|
| DE | 4340471 A1 | * | 2/1995 | B62M/25/08 |
| EP | 0120571 A1 | * | 10/1984 | 474/70 |
| FR | 2812612 A1 | * | 2/2002 | B62M/9/12 |
| JP | 58-186741 U | | 12/1983 | |
| JP | 59-59087 A | | 4/1984 | |
| JP | 60-98236 A | | 6/1985 | |
| JP | 01-73481 U | | 5/1989 | |
| JP | 03-37056 B2 | | 6/1991 | |
| JP | 04-156473 A | * | 5/1992 | G03G/15/00 |
| JP | 05-30767 A | | 2/1993 | |
| JP | 05-66838 A | | 3/1993 | |
| JP | 08-223953 A | | 8/1996 | |
| JP | 08-251982 A | | 9/1996 | |
| JP | 09-47051 A | | 2/1997 | |
| JP | 2544005 Y2 | | 5/1997 | |
| JP | 09-256428 A | | 9/1997 | |
| JP | 2727497 B2 | | 12/1997 | |
| JP | 10-285005 A | | 10/1998 | |
| JP | 2852142 B2 | | 11/1998 | |
| JP | 11-122961 A | | 4/1999 | |
| JP | 3069612 U | | 3/2000 | |

* cited by examiner

Primary Examiner—Marcus Charles
(74) Attorney, Agent, or Firm—Shinjyu Global IP Counselors, LLP

(57) ABSTRACT

A motorized bicycle actuator assembly has a motorized actuator unit arranged to operate a bicycle component. The motorized actuator unit has a drive train coupled to a reversible motor, and a position switch device or an overcurrent detecting circuit coupled to the motor to stop rotation of a drive axle of the drive train at first and second stop positions. The bicycle component is coupled to the drive axle to move a movable member between a first and second preset component positions that correspond to the first and second stop positions of the drive axle, respectively. First and second shock absorbing elements are arranged to cushion the drive train when the drive axle moves past the first and second stop positions of the drive axle, respectively.

36 Claims, 28 Drawing Sheets

MOTORIZED BICYCLE ACTUATOR ASSEMBLY

BACKGROUND OF THE INVENTION

1. Field of the Invention

This invention generally relates to a motorized bicycle actuator assembly. More specifically, the present invention relates protecting a motor and drive train of a bicycle component when a malfunction occurs that results in the motor being energized longer than necessary.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

In particular, bicycle components have become motorized so as to increase the performance of the bicycle and the ease of operating the bicycle. For example, one part of the bicycle that has been motorized is the transmission or drive train of the bicycle. Thus, many bicycles have been provided with an electronic drive train for smoother shifting. These electronic drive trains include a rear multi-stage sprocket assembly with a motorized rear derailleur and a front multi-stage sprocket assembly with a motorized front derailleur. These derailleurs are electronically operated by a cycle computer for automatically and/or manually shifting of the derailleurs.

A typical bicycle transmission is operated by a shift operating wire connected between the transmission and a manually operated shift operating device mounted on the handlebar. The rider operates the shift operating device to selectively pull or release the shift operating wire which, in turn, operates the transmission in the desired manner. In a motorized bicycle transmission, the rider pushes a button and a motor is activated to operate the derailleur for completing a shift operation.

One problem with motorized bicycle components is that the motor may overrun due to faulty electrical cables or other electrical components. Moreover, the motor may overrun due to the bicycle component being out of adjustment. If the motor overruns, the drive train for operating the bicycle component may become damaged due to the gear train constantly coming to an abrupt stop.

In view of the above, there exists a need for a motorized bicycle component which overcomes the above mentioned problems in the prior art. This invention addresses this need in the prior art as well as other needs, which will become apparent to those skilled in the art from this disclosure.

SUMMARY OF THE INVENTION

One object of the present invention is to provide a motor of a motorized bicycle component in which the motor and drive train are protected in the event of a malfunction.

Another object of the present invention is to provide a power assist for a front derailleur that protects the motor and drive train in the event of a malfunction.

The foregoing objects can basically be attained by providing a motorized bicycle actuator assembly that protects the parts in the event of a malfunction. The motorized bicycle actuator assembly comprising a motorized actuator unit, a bicycle component operatively coupled to the motorized actuator unit, a control device operatively coupled to the motorized actuator unit to stop operation of the motorized actuator unit at first and second stop positions; and first and second shock absorbing elements arranged to prevent damage when the motorized actuator unit is driven past the first and second stop positions. The motorized actuator unit includes a reversible motor, a drive train operatively coupled to the reversible motor, and a control device operatively coupled to the reversible motor to stop rotation of a drive axle of the drive train at first and second stop positions. The bicycle component operatively is coupled to the drive axle to move a movable member between a first preset component position and a second preset component position that correspond to the first and second stop positions of the drive axle, respectively. At least one shock absorbing element is operatively arranged to cushion movement of the drive train when the drive axle moves past at least one of the first and second stop positions of the drive axle.

According to one aspect of the present invention, the control device is a position switch device operatively coupled to the motor to stop rotation of the drive axle of the drive train at the first and second stop positions. According to another aspect of the present invention, the control device is an overcurrent detecting circuit operatively coupled to the motor to stop rotation of the drive axle of the drive train at the first and second stop positions.

In one preferred embodiment, the bicycle component is a front derailleur. However, it will be apparent to those skilled in the art from this disclosure that the bicycle component can be any motorized bicycle component. For example, the bicycle component of the present invention can be a rear derailleur, a motorized suspension, or any other suitable motorized bicycle component.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
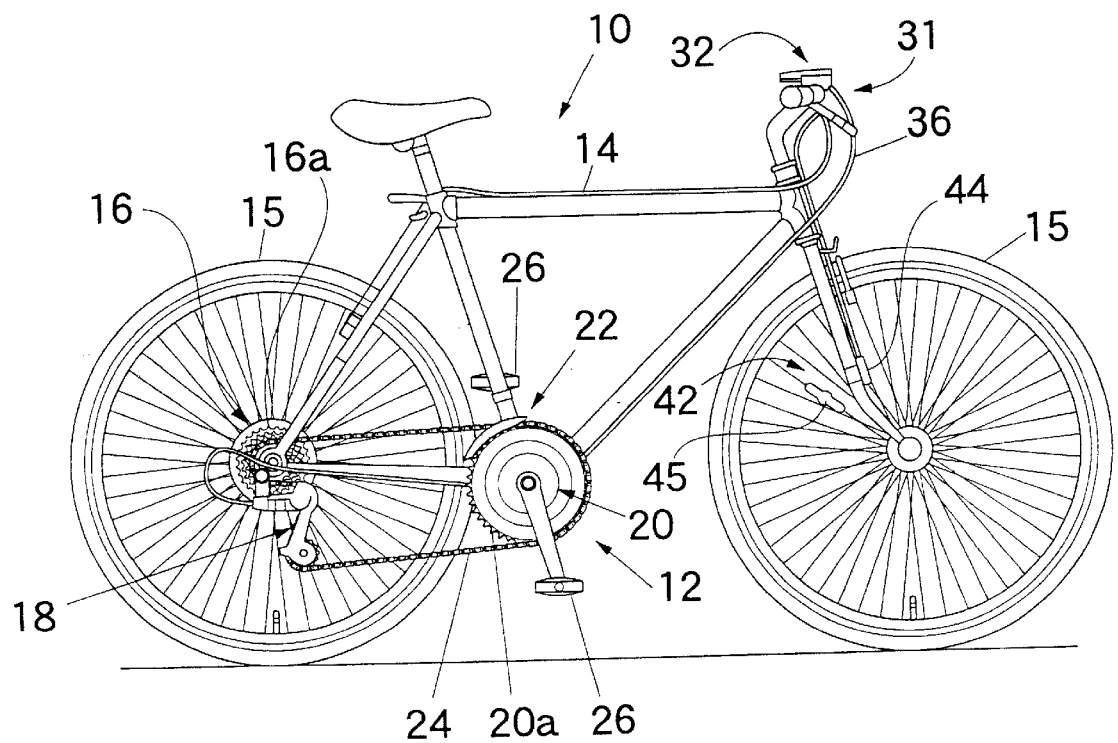
FIG. 1 is a side elevational view of a conventional bicycle with an electronically controlled drive train in accordance with one embodiment of the present invention.
Figure 2:
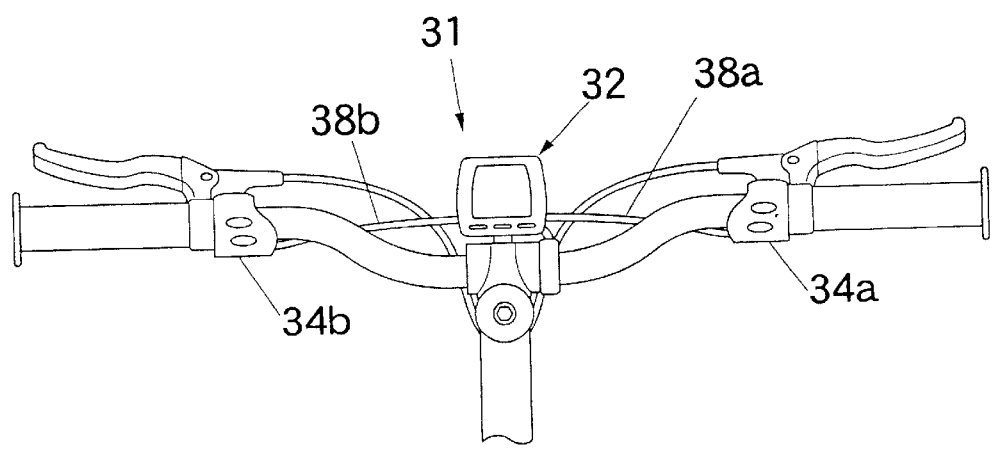
FIG. 2 is a top plan view of the handlebar portion of the bicycle illustrated in FIG. 1 with a shift control unit and a pair of shifting devices coupled thereto.
Figure 3:
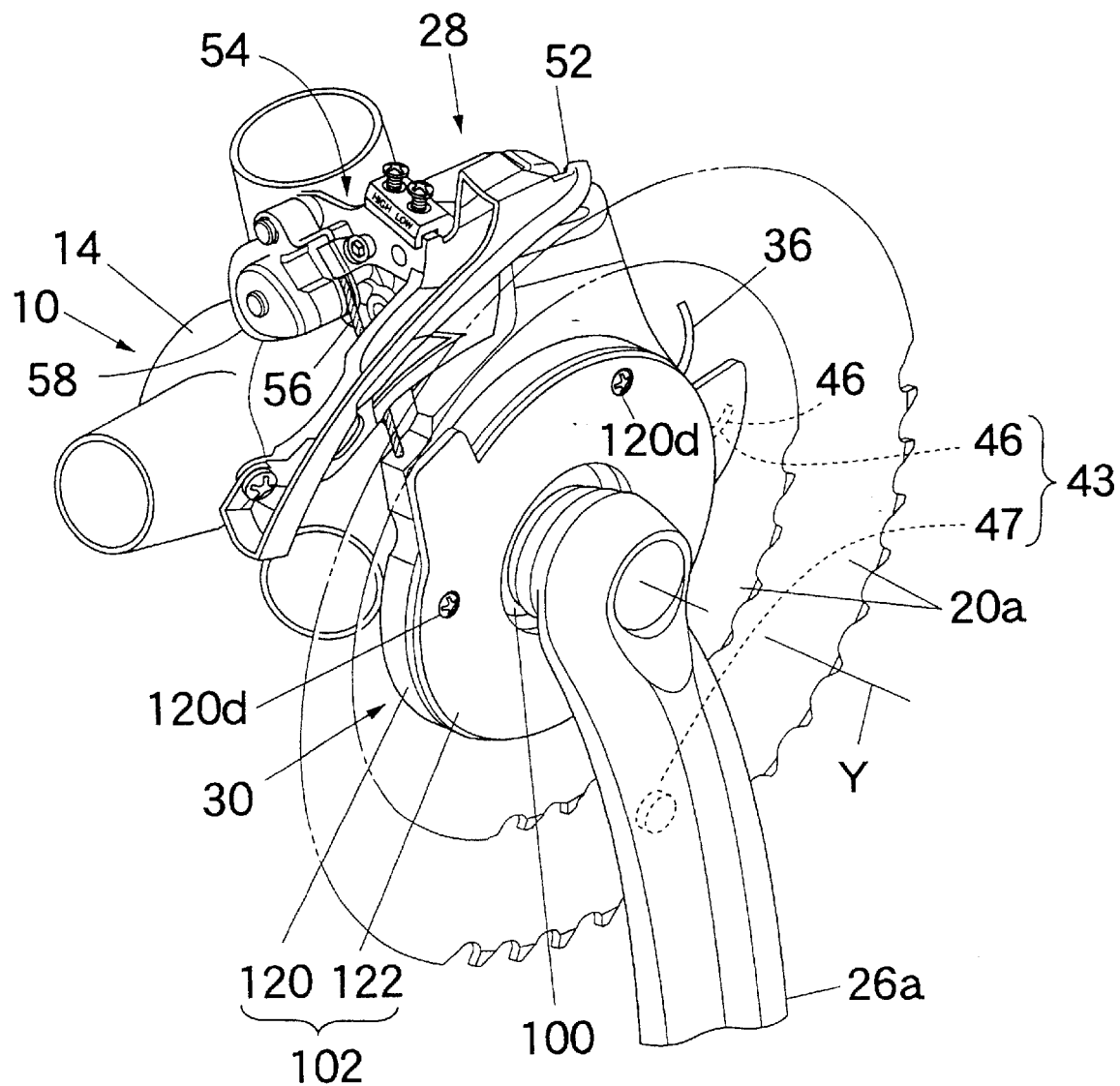
FIG. 3 is a perspective view of the front derailleur assembly that incorporates a shift assisting apparatus according to the present invention for shifting a bicycle transmission or drive train.

Referring initially to FIGS. 1–3, a bicycle 10 is illustrated with an electronically controlled drive train 12 in accordance with a first embodiment of the present invention, as discussed below. The bicycle 10 basically has a frame 14 and a pair of wheels 15, with the rear wheel being driven by the drive train 12. The bicycle 10 and its various components are well known in the prior art, except for the improved portions of the drive train 12 of the present invention. Thus, the bicycle 10 and its various components will not be discussed or illustrated in detail herein, except for the components that relate to the drive train 12 of the present invention. Moreover, various conventional bicycle parts such as brakes, additional sprockets, etc., which are not illustrated and/or discussed in detail herein, can be used in conjunction with the present invention.

As used herein, the terms "forward, rearward, upward, above, downward, below and transverse" refer to those directions of a bicycle in its normal riding position. Accordingly, these terms, as utilized to describe the present invention in the claims, should be interpreted relative to the bicycle 10 in its normal riding position.

Still referring to FIGS. 1–3, the drive train 12 basically includes a rear multistage sprocket assembly 16 with a motorized rear derailleur assembly or chain shifting device 18, a front multi-stage sprocket assembly 20 with a motorized front derailleur assembly or chain shifting device 22, a chain 24 extending between the rear multistage sprocket assembly 16 and the front multi-stage sprocket assembly 20, and a pair of pedals 26 mounted on a bottom bracket 27 to rotate the front multi-stage sprocket assembly 20. The rear multi-stage sprocket assembly 16 has a plurality of sprockets or gears 16a that are arranged in a conventional manner. The front multi-stage sprocket assembly 20 has a plurality of sprockets or gears 20a that are arranged in a conventional manner. In the illustrated embodiment, the front multi-stage sprocket assembly 20 has two sprockets or gears 20a.

Figure 4:
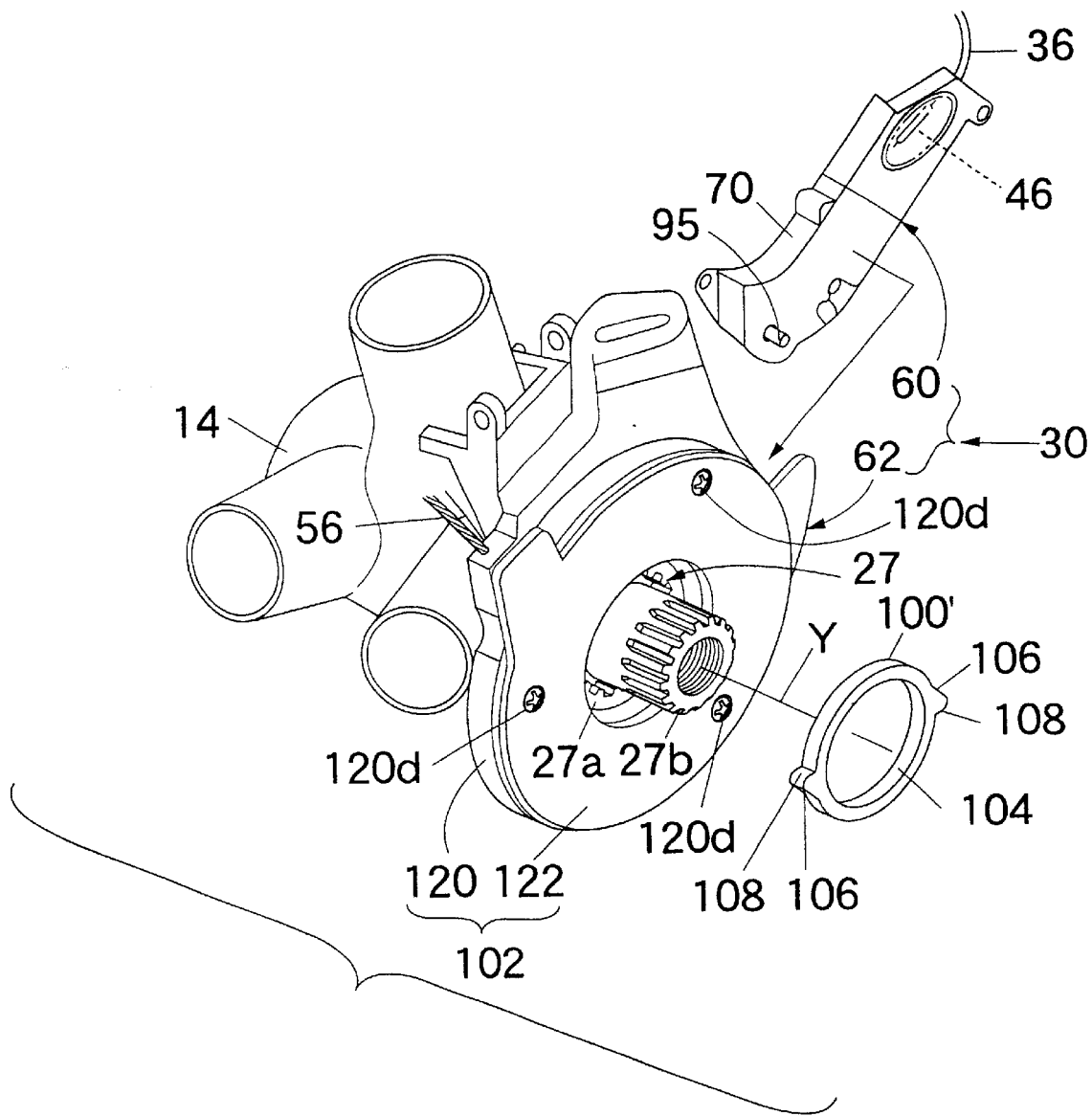
FIG. 4 is a partially exploded perspective view of the shift assisting apparatus for the front derailleur assembly illustrated in FIG. 3 with the derailleur and the crank arm removed.

As seen in FIGS. 3 and 4, the front derailleur assembly 22 basically includes a front derailleur 28 and a shift assisting apparatus 30. The front derailleur 28 is preferably a conventional front derailleur that is cable operated. An electronic control system 31 is used to operate the shift assisting apparatus 30, which in turn operates the front derailleur 28. The shift assisting apparatus 30 utilizes power from the drive train 12 to move the front derailleur 28 between a first shift position and a second shift position as explained below in more detail.

As seen in FIG. 2, the electronic control system 31 basically includes a shift control unit or cycle computer 32 and a pair of shifting devices 34a and 34b. The shift control unit 32 is electrically coupled to the motorized derailleur assemblies 18 and 22 by an electrical control cord 36. The shift control unit 32 is also electrically coupled to the shifting devices 34a and 34b via the electrical cords 38a and 38b, respectively. It will be apparent to those skilled in the art from this disclosure, the electronic control system 31 can also be utilized to control other electronically operated components such as the front and rear suspension and/or other components of the bicycle 10.

The shift control unit or cycle computer 32 preferably includes a microcomputer formed on a printed circuit board that is powered by a battery unit. The microcomputer of the shift control unit 32 includes a central processing unit (CPU), a random access memory component (RAM), a read only memory component (ROM), and an I/O interface. The various components of the microcomputer are well known in the bicycle field. Therefore, the components used in the microcomputer of the shift control unit 32 will not be discussed or illustrated in detail herein. Moreover, it will be apparent to those skilled in the art from this disclosure that the shift control unit 32 can include various electronic components, circuitry and mechanical components to carryout the present invention. Of course, it will be apparent to those skilled in the art from this disclosure that the shift control unit 32 can have a variety of configurations, as needed and/or desired.

Preferably, the shift control unit 32 is a cycle computer that provides or displays various information to the rider via a display and that operates the motorized derailleur assemblies 18 and 22. Thus, the drive train 12 of the bicycle 10 is operated or electronically controlled by the shift control unit 32. More specifically, the shift control unit 32 is a cycle computer that electrically operates the motorized derailleur assemblies 18 and 22 either automatically or manually as explained below. One example of an automatic shifting assembly that can be adapted to be used with the present invention is disclosed in U.S. Pat. No. 6,073,061 to Kimura, which is assigned to Shimano Inc.

In the manual mode, shifting of each of the motorized derailleur assemblies 18 and 22 is preformed by via manually shifting the shift devices 34a and 34b. Depressing one of the shift buttons of the shift devices 34a and 34b generates a predetermined operational command that is received by the central processing unit of the shift control unit 32. The central processing unit of the shift control unit 32 then sends a predetermined operational command or electrical signal to move or shift one of the motorized derailleur assemblies 18 and 22.

In the automatic mode, shifting of each of the motorized derailleur assemblies 18 and 22 is preferably at least partially based on the speed of the bicycle and the torque applied to the pedals 26. Thus, the shift control unit 32 further includes at least one speed sensing/measuring device or component 42 and at least one torque sensing/measuring device or component 43. The speed sensing/measuring device or component 42 provides information indicative of the speed of the bicycle 10 to the central processing unit of the shift control unit 32. The torque sensing/measuring device or component 43 provides information indicative of the torque applied to the pedals 26 to the central processing unit of the shift control unit 32. The sensing/measuring components 42 and 43 generates predetermined operational commands indicative of the speed of the bicycle 10 and the torque applied to the pedals 26, respectively. Of course, additional sensing/measuring components can be operatively coupled to central processing unit of the shift control unit 32 such that predetermined operational commands are received by the central processing unit (CPU) of the shift control unit 32 to automatically operate the motorized derailleur assemblies 18 and 22 or other components.

The sensing/measuring component 42 can be, for example, a speed sensing unit that includes a sensor 44 and a magnet 45. The sensor 44 is preferably a magnetically operable sensor that is mounted on the front fork of the bicycle 10 and senses the magnet 45 that is attached to one of the spokes of the front wheel of the bicycle 10. The sensor 44 can be a reed switch or other component for detecting the magnet 45. The sensor 44 generates a pulse each time wheel of the bicycle 10 has turned a pre-described angle or rotation. In other words, the sensor 44 detects the rotational velocity of the front wheel of the bicycle 10. As soon as sensor 44 generates the pulse or signal, a pulse signal transmission circuit sends this pulse signal to the central processing unit of the shift control unit 32. The shift control unit 32 determines whether the chain 24 should be upshifted or downshifted, based on this speed information and any other relevant information that it has available. Thus, the sensor 44 and the magnet 45 form a sensing device or measuring component of the shift control unit 32. In other words, the sensor 44 outputs a bicycle speed signal by detecting a magnet 45 mounted on the front wheel of the bicycle 10. Thus, speed information is sent to the battery operated electronic shift control unit 32 to operate the motorized derailleur assemblies 18 and 22, as needed and/or desired.

The sensing/measuring component 43 can be, for example, a torque sensing unit that includes a sensor 46 and a magnet 47. The sensor 46 is preferably a magnetically operable sensor that is mounted on a stationary part (the shift assisting apparatus 30) of the bicycle 10. The sensor 46 senses the magnet 47 that is attached to the crank arm 26a of the bicycle 10. The sensor 46 can be a reed switch or other component for detecting the magnet 47. The sensor 46 generates a pulse each time the crank arm 26a of the bicycle 10 has turned a pre-described angle or rotation. In other words, the sensor 46 detects the rotational torque of the crank arm 26a of the bicycle 10. As soon as sensor 46 generates the pulse or signal, a pulse signal transmission circuit sends this pulse signal to the central processing unit of the shift control unit 32. The shift control unit 32 determines whether the chain 24 should be upshifted or downshifted, based on this speed information and any other relevant information that it has available. Thus, the sensor 46 and the magnet 47 form a sensing device or measuring component of the shift control unit 32. In other words, the sensor 46 outputs a bicycle torque signal by detecting a magnet 47 mounted on the crank arm 26a of the bicycle 10. Thus, torque information is sent to the battery operated electronic shift control unit 32 to operate the motorized derailleur assemblies 18 and 22, as needed and/or desired.

Referring to FIG. 4, the front derailleur 28 fixedly coupled to the shift assisting apparatus 30 which in turn is fixed to the bottom bracket 27 of the bicycle frame 14. Preferably, the front derailleur 28 is illustrated as being movably coupled to the shift assisting apparatus 30. Of course, it will be apparent to those skilled in the art from this disclosure that the front derailleur 28 can be coupled directly to the bottom bracket 27 or to other parts of the bicycle such as the seat post as needed and/or desired.

The front derailleur 28 is operated by the shift control unit 32 to move the chain 24 between sprockets 22a. More specifically, the rider pushes one of the buttons on the shifting devices 34b that activates the shift assisting apparatus 30 which in turn moves the front derailleur 28 between its top and low shift positions.

Still referring to FIG. 3, the front derailleur 28 basically a chain guide 52 and a linkage assembly 54 that are coupled the shift assisting apparatus 30. The front derailleur 28 is a conventional component that is well known in the art. Since front derailleurs are well known in the art, the construction of the front derailleur 28 will not be discussed or illustrated in detail herein. A cable 56 or wire is fixedly coupled between the shift assisting apparatus 30 and an operating arm or lever 58 of the linkage assembly 54. Thus, the shift assisting apparatus 30 operates the front derailleur 28 by pulling or releasing the operating wire 56. When the operating wire 56 is pulled downwardly, the chain guide 52 moves from a retracted (low gear) position to an extended (high or top gear) position. When the operating wire 56 is released upwardly, the chain guide 52 moves from the extended (top gear) position to the (low gear) retracted position. The linkage assembly 54 is preferably designed such that a biasing member (torsion spring) normally biases the chain guide 52 in a transverse direction towards the frame 14 of bicycle 10, i.e., towards the low gear position. In other words, when the chain guide 52 is closest to the frame of bicycle 10, the chain guide 52 holds the chain 24 over the low gear or sprocket 20a that is closest to the bicycle frame 14.

The shift assisting apparatus 30 includes a motorized actuator unit 60 that operates a power transfer mechanism 62 such that the rotational force of the crank arm 26a pulls or releases the operating wire 56 of the front derailleur 28. The motorized actuator unit 60 is operatively coupled to the shift control unit 32 via the electrical control cord 36 and to the shifting device 34b via the electrical cord 38b for receiving the upshift signal and the downshift signal. The motorized actuator unit 60 is operatively coupled to the power transfer mechanism 62, which operates the front derailleur 28. The power transfer mechanism 62 is operatively coupled to the crank arm 26a so that the pedaling force is used to shift the front derailleur 28 as explained below.

Figure 10:
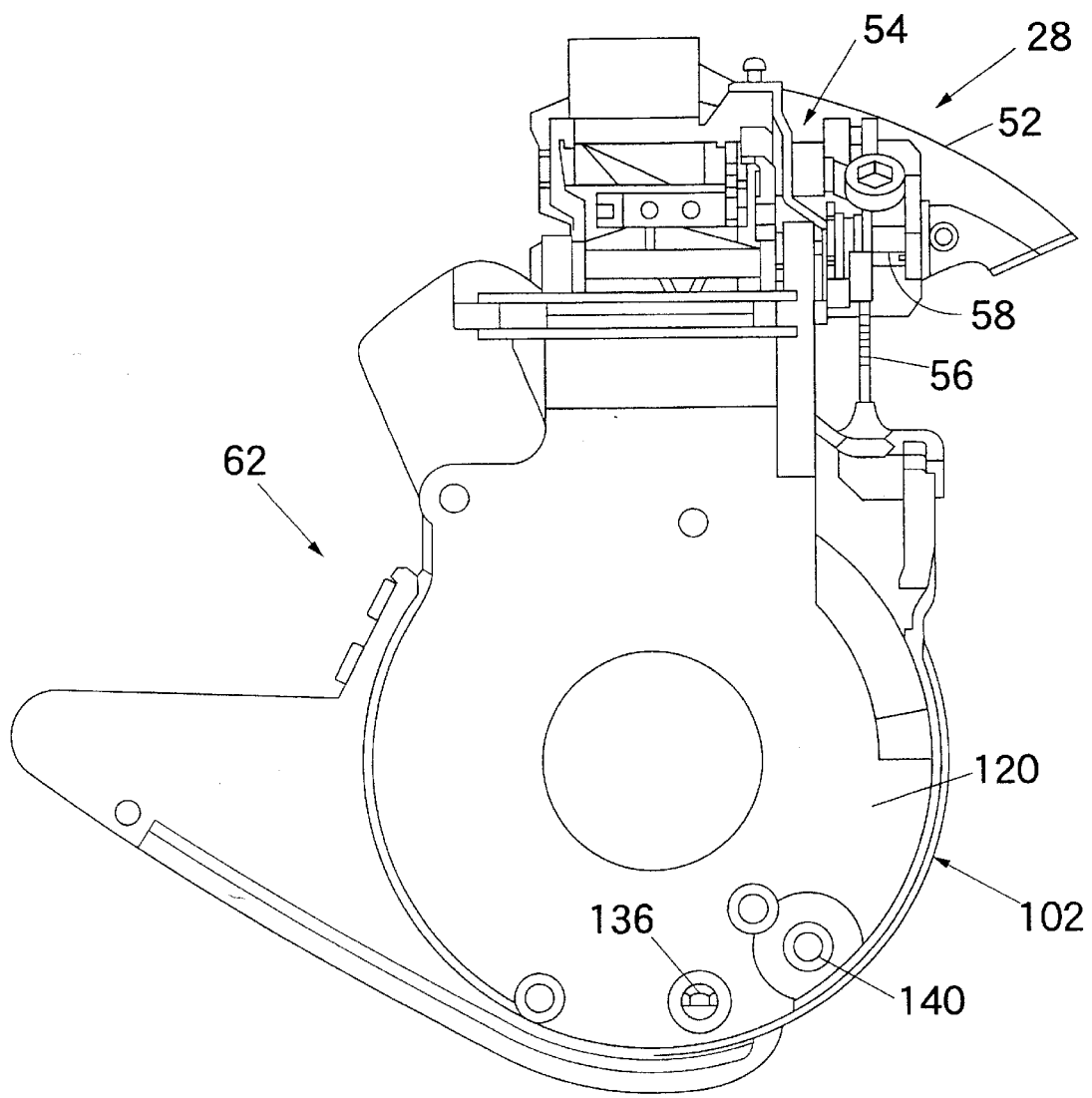
FIG. 10 is a rear elevational view of the driven member of the shift assisting apparatus and the front derailleur assembly illustrates in FIGS. 3 and 4.
Figure 11:
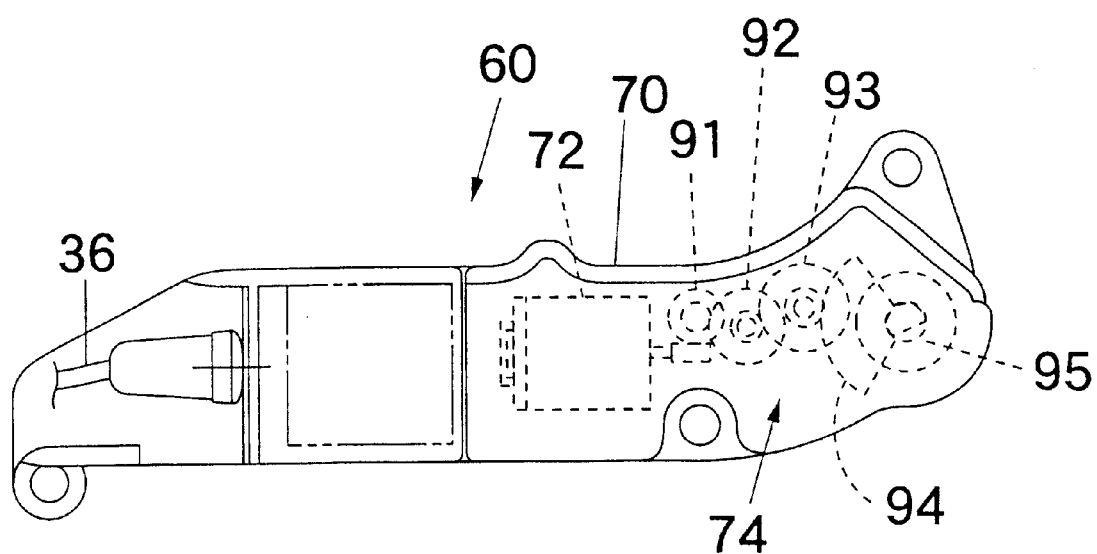
FIG. 11 is a first side elevational view of the motorized actuator unit of the shift assisting apparatus for the front derailleur assembly illustrated in FIGS. 3 and 4.
Figure 12:
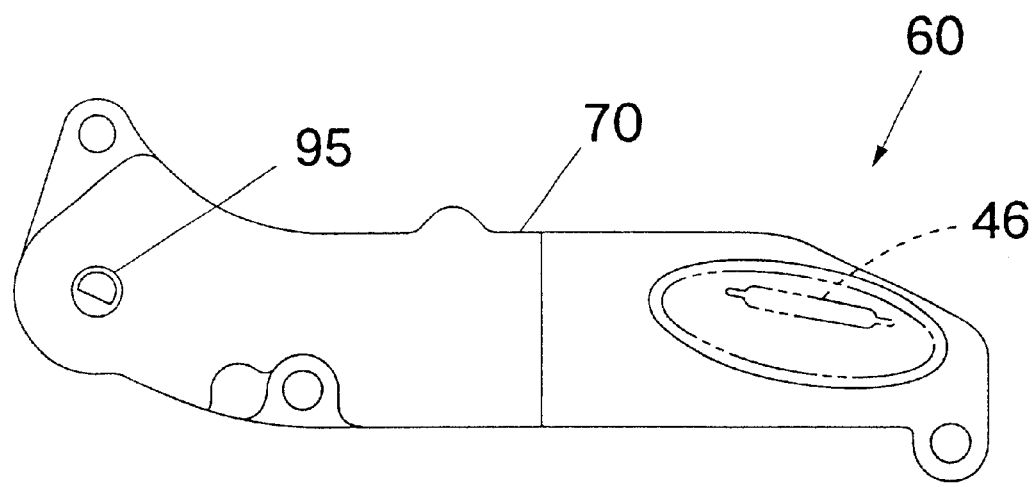
FIG. 12 is a second elevational view of the motorized actuator unit of the shift assisting apparatus for the front derailleur assembly illustrated in FIGS. 3 and 4.
Figure 13:
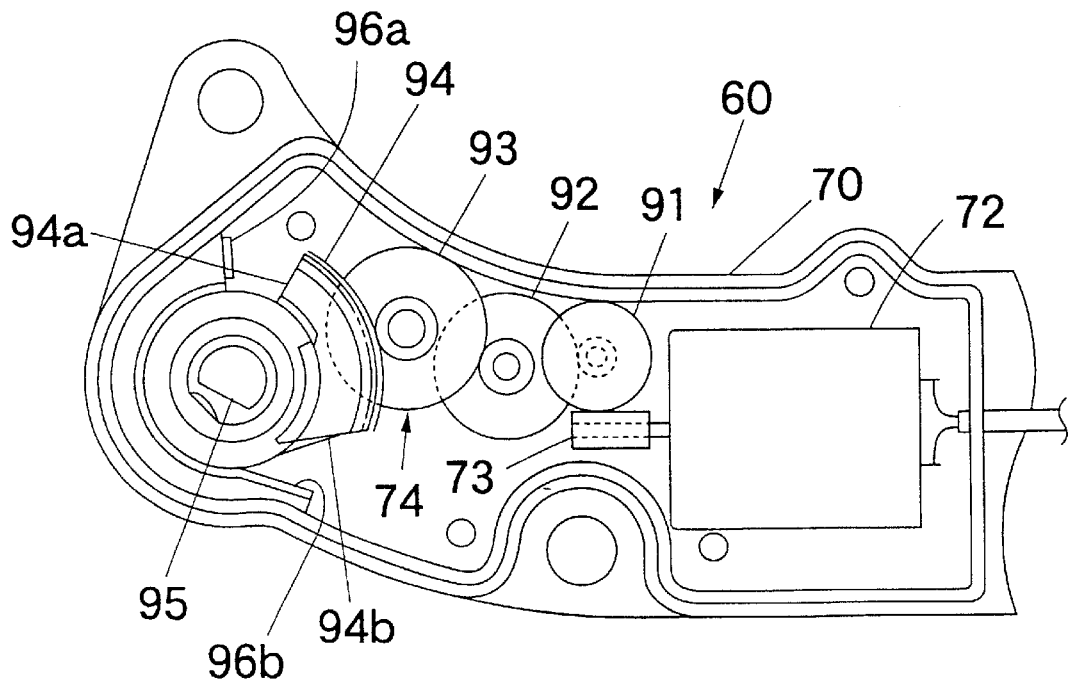
FIG. 13 is a partial inside elevational view of the motorized actuator unit (cover removed) of the shift assisting apparatus for the front derailleur assembly illustrated in FIGS. 3 and 4, with the drive axle in a first stop position that corresponds to the first preset or top component position.
Figure 14:
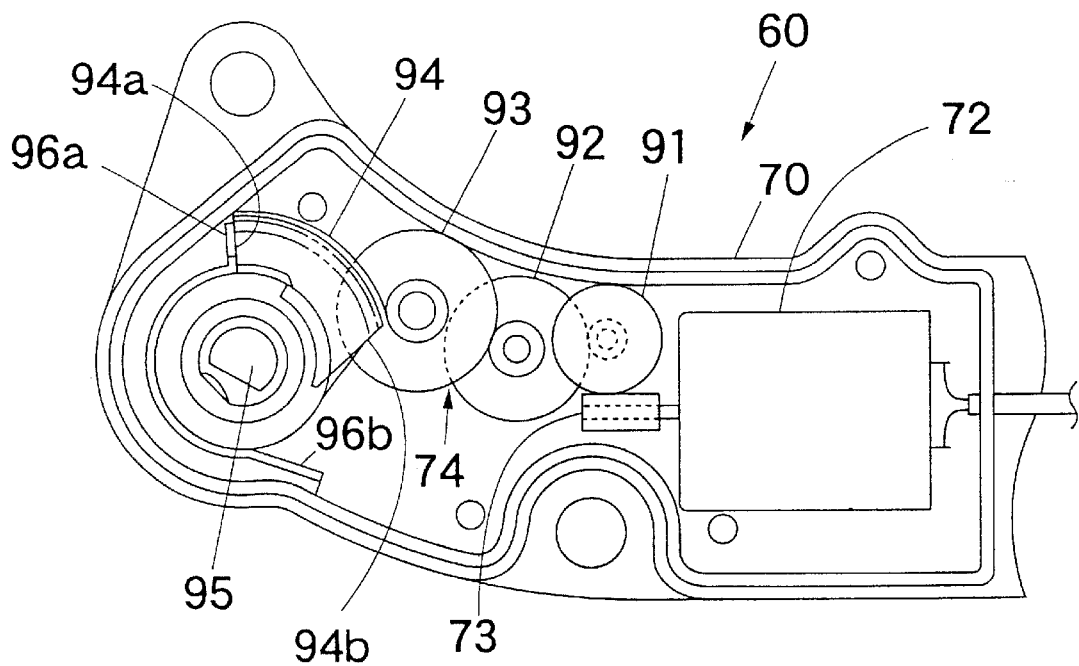
FIG. 14 is a partial inside elevational view of the motorized actuator unit (cover removed) of the shift assisting apparatus for the front derailleur assembly illustrated in FIGS. 3 and 4, with the drive axle in a first overrun position such that the drive gear is contacting the first shock absorbing element.
Figure 15:
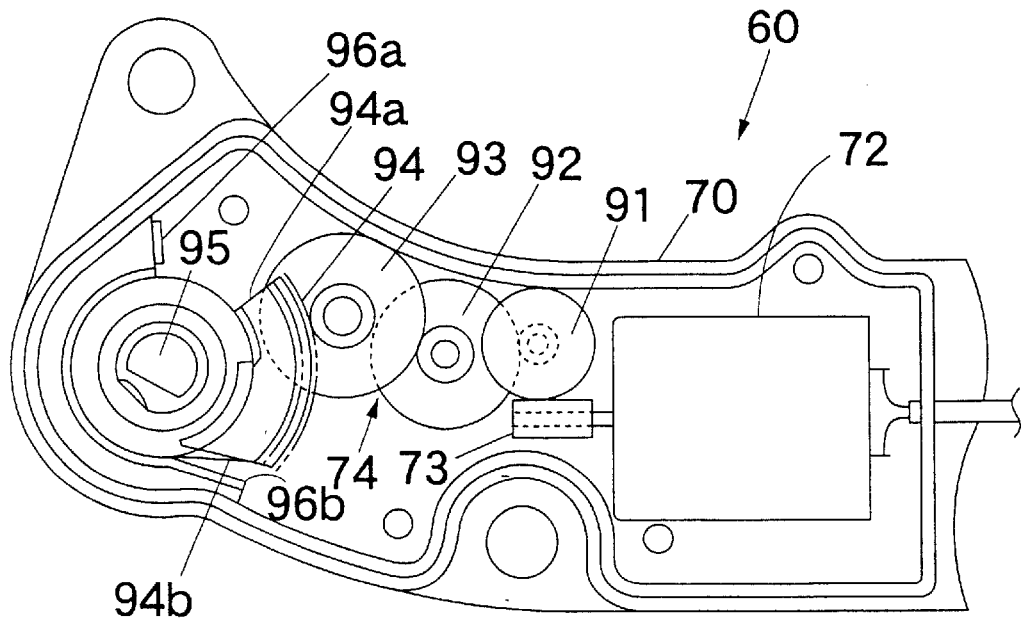
FIG. 15 is a partial inside elevational view of the motorized actuator unit (cover removed) of the shift assisting apparatus for the front derailleur assembly illustrated in FIGS. 3 and 4, with the drive axle in a second stop position that corresponds to the second preset or low component position.
Figure 16:
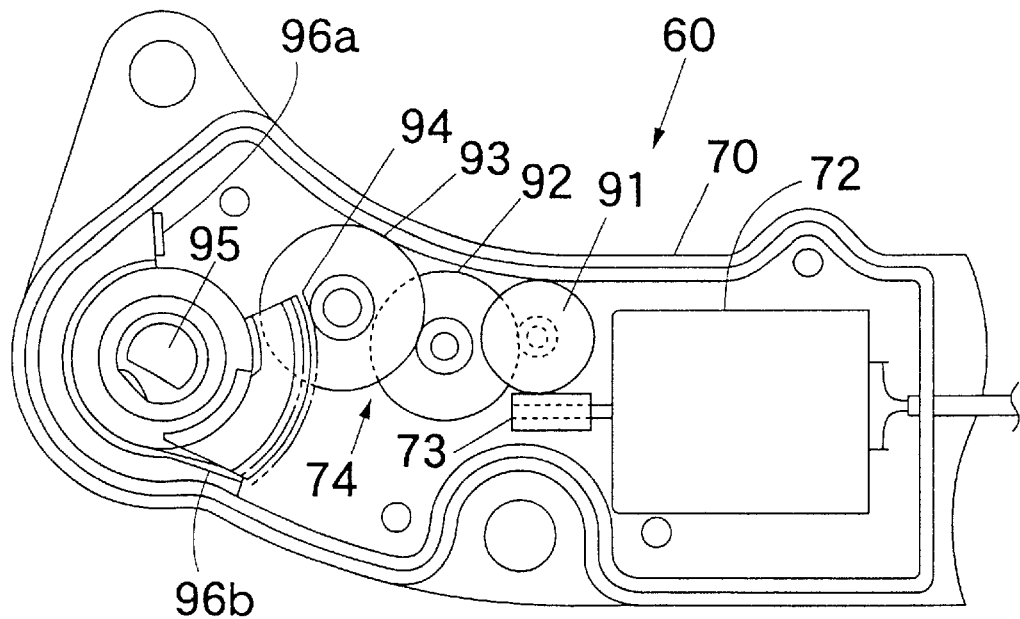
FIG. 16 is a partial inside elevational view of an actuator unit (cover removed) of the shift assisting apparatus for the front derailleur assembly illustrated in FIGS. 3 and 4, with the drive axle in a second overrun position such that the drive gear is contacting the second shock absorbing element.
Figure 17:
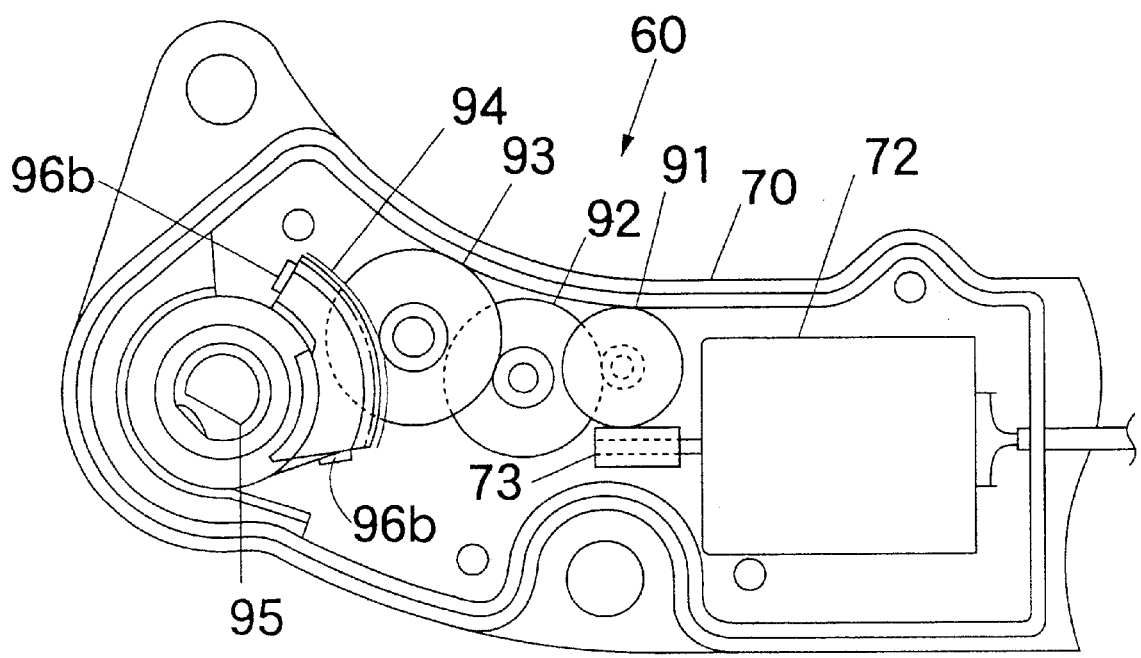
FIG. 17 is a partial inside elevational view of an actuator unit (cover removed) of the shift assisting apparatus in accordance with another embodiment of the present invention.
Figure 18:
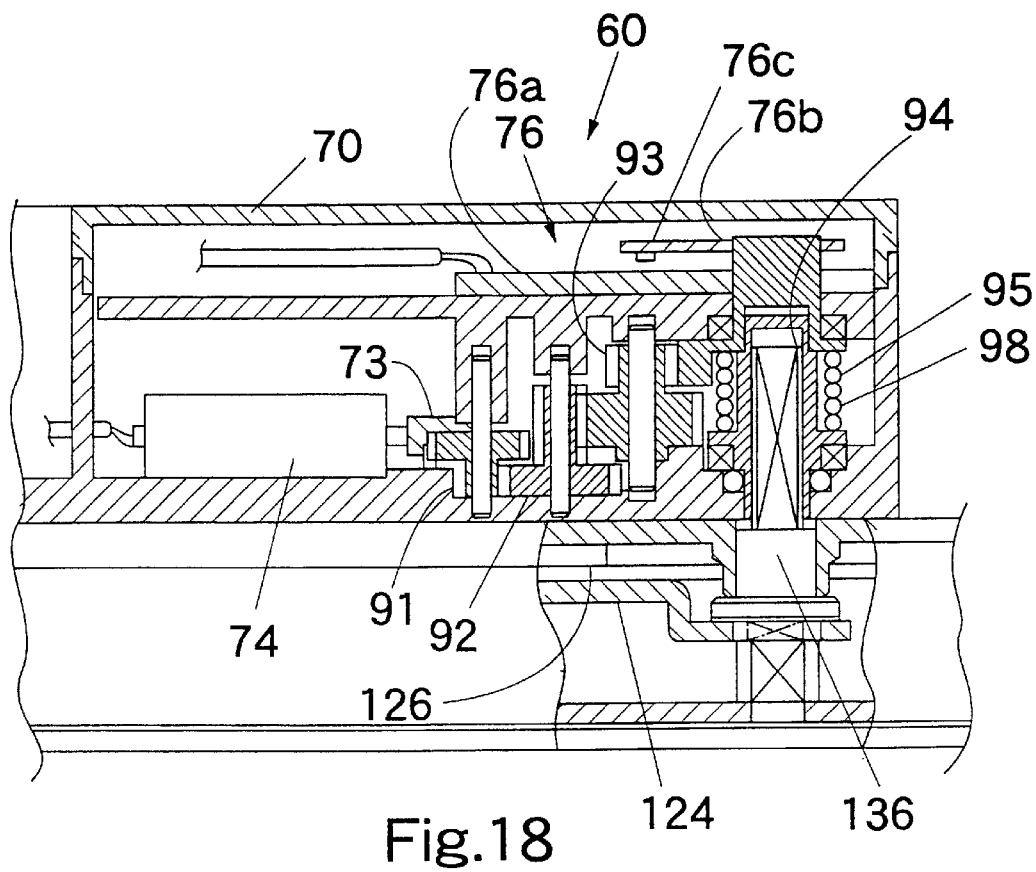
FIG. 18 is a bottom view of the driven member and the motorized actuator unit of the shift assisting apparatus with certain portions broken away for purposes of illustration.

As seen in FIGS. 11–19, the motorized actuator unit 60 basically includes a housing 70 with a reversible motor 72, a gear drive train 74 and a position control device or switch 76 (FIG. 18). The housing 70 is mounted to the rear or inside surface of the power transfer mechanism 62 (FIG. 10) via bolts (not shown) such that the gear drive train 74 operates the power transfer mechanism 62.

Figure 7:
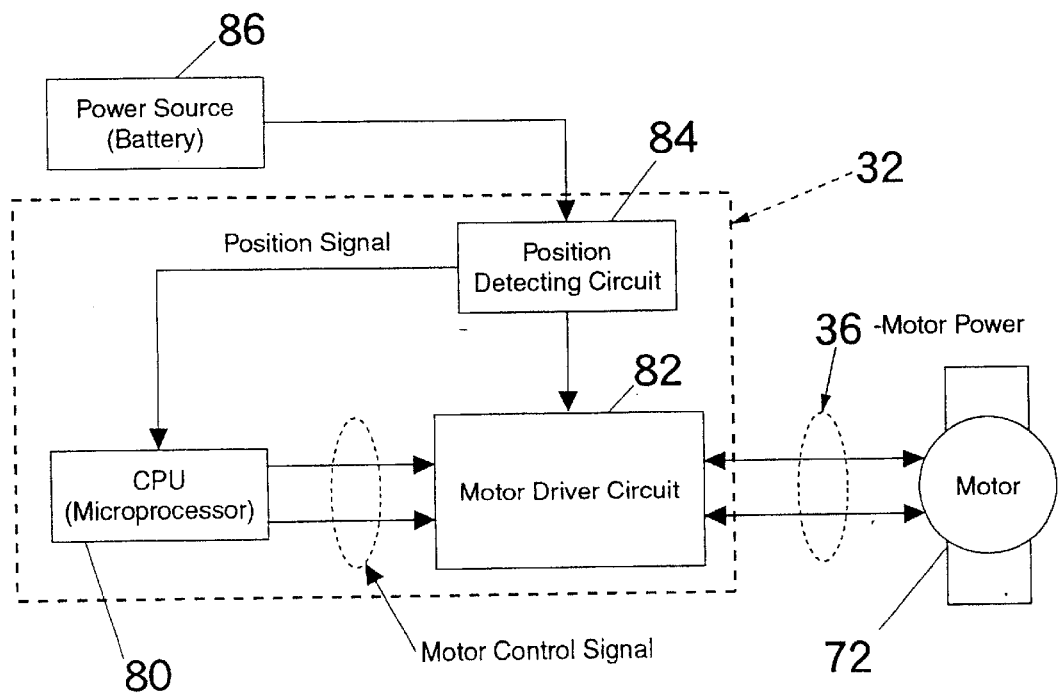
FIG. 7 is a schematic diagram illustrating the operation of the motor of the shift assisting apparatus for the front derailleur assembly using a position detecting circuit.
Figure 8:
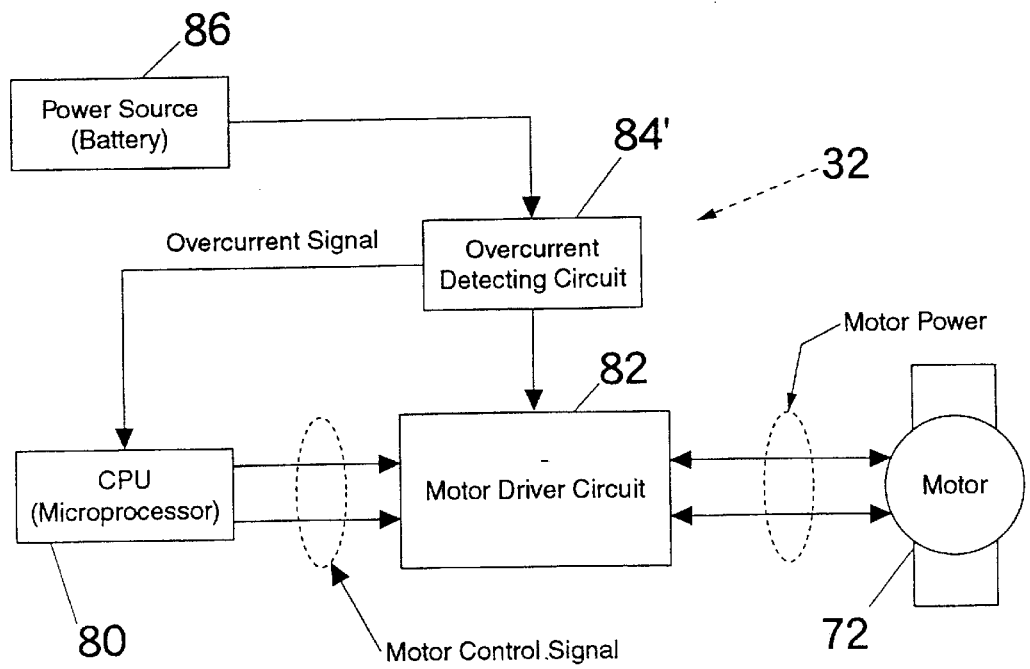
FIG. 8 is a schematic diagram illustrating the operation of the motor of the shift assisting apparatus for the front derailleur assembly using an overcurrent detecting circuit.
Figure 9:
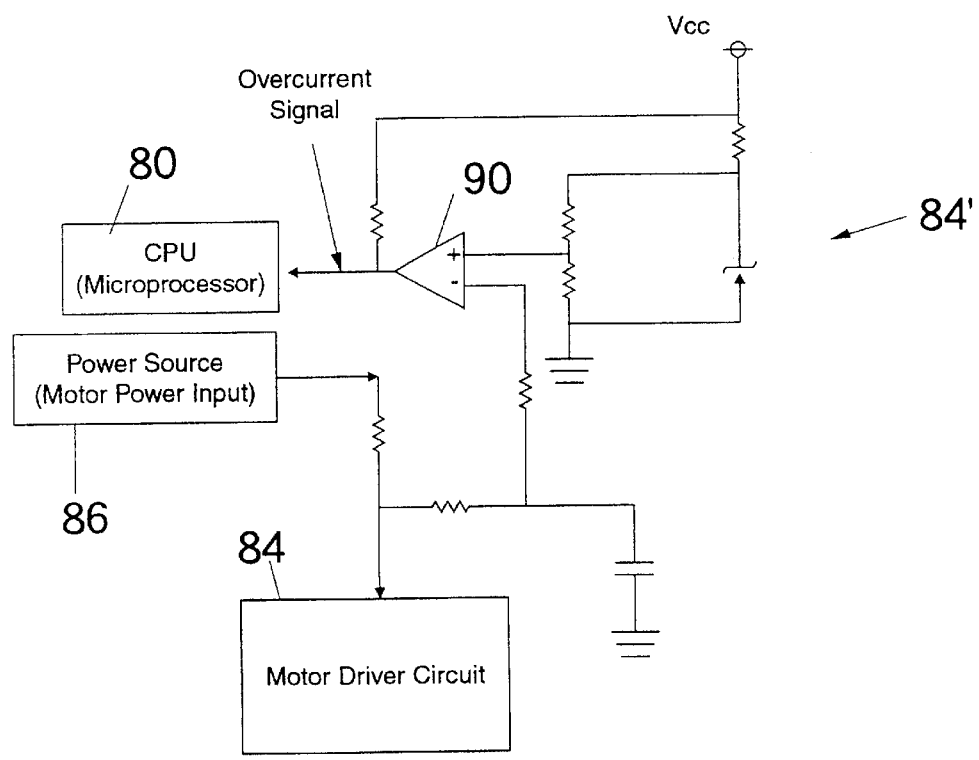
FIG. 9 is a schematic diagram illustrating the overcurrent detecting circuit for stopping the operation of the motor of the shift assisting apparatus for the front derailleur assembly.

Referring to FIG. 7, the motor 72 of the motorized actuator unit 60 is electrically connected by the electrical cord 36 to the shift control unit 32 which has a microcomputer 80 with a motor driver circuit 82. A position detecting circuit 84 is operatively coupled to the central processing unit of the microcomputer 80 and/or the motor driver circuit 82 for stopping the motor 72. In the main embodiment, the position control device or switch 76 detects the position of drive axle 95 of the gear drive train 74 to send a signal to stop the motor 72. Alternatively, as seen in FIGS. 8 and 9, the position detecting circuit 84 can be replaced with an overcurrent detecting circuit 84' is operatively coupled the central processing unit of the microcomputer 80 and/or the motor driver circuit 82 for stopping the motor 72 as explained below.

The power source or battery 86 can be located in either the shift control unit 32 or a separate housing (not shown), and is operatively coupled to the motor 72 via the motor driver circuit 82 and to either the position detecting circuit 84 or the overcurrent detecting circuit 84'. When the position detecting circuit 84 is used, the predetermined end positions of the gear drive train 74 are detected by the position control device or switch 76 to stop the movement of the motor 72, as explained below. When the overcurrent detecting circuit 84' is used, the central processing unit of the microcomputer 80, the motor driver circuit 82 and the overcurrent detecting circuit 84' operate together to stop the movement of the motor 72 upon detection of the motor 72 beginning to lock up.

Figure 5:
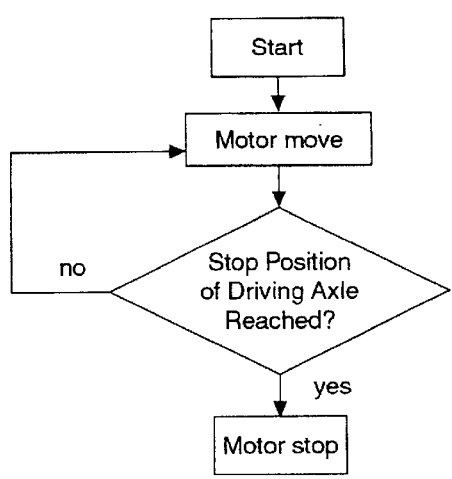
FIG. 5 is a flowchart illustrating a motor control routine for stopping the motor of the shift assisting apparatus for the front derailleur assembly illustrated in FIGS. 3 and 4.
Figure 6:
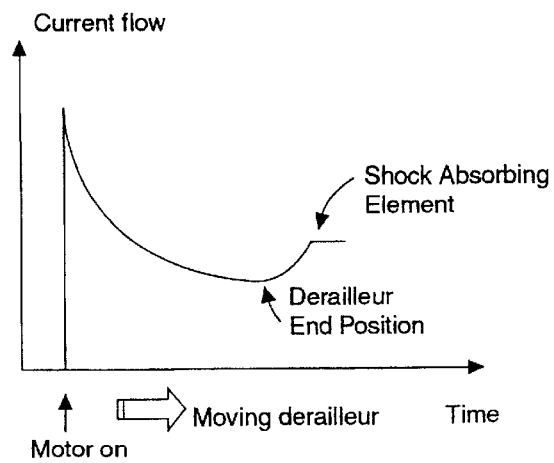
FIG. 6 is a graph illustrating the current flow to the motor verses movement of the shift assisting apparatus for the front derailleur assembly during a shift operation of the front derailleur assembly illustrated in FIGS. 3 and 4.

As seen in FIGS. 5 and 6, the microcomputer 80 has a control program, which receives drive axle stop position and signal from the position detecting circuit 84 for controlling the operation of the motor 72. More specifically, when the rider pushes a button on the shifting device 34b to start a shifting operation, the microcomputer 80 will then send a signal to the motor driver circuit 82 to have the power source or battery 86 energize the motor 72 in the desired direction. The motor 72 is preferably a reversible motor that can be driven in either a clockwise or a counterclockwise direction so as to move the derailleur 28 between first and second shift or preset component positions. The position detecting circuit 84 will stop energizing the motor 72 when the derailleur 28 reaches the new position in accordance with the signal sent by the position control switch 76. The first and second shift or preset component positions of the derailleur 28 preferably correspond to the end positions of the drive train 74 as explained below.

In other words, when the motor 72 begins to lock up, this will increase the current level such that an overcurrent signal is sent from the overcurrent detecting circuit 84' back to the central processing unit of the microcomputer 80 to stop the electricity from energizing the motor 72.

As seen in FIG. 9, the overcurrent detecting circuit 84' has a comparator 90 that compares the voltage being inputted into the motor driver circuit 82 with a predetermined voltage Vcc. If the voltage in the motor driver circuit 82 becomes greater than the predetermined voltage Vcc, then the comparator 90 will send a signal to the central processing unit of the microcomputer 80 to send a motor control signal to the motor driver circuit 82 which will stop the flow of current to the motor 72.

Referring now to FIGS. 13–19, the gear drive train 74 of the motorized actuator unit 60 will now be discussed in more detail. The gear drive train 74 includes three power transfer gears 91, 92 and 93, a drive gear 94 and a drive axle 95 that transmits the rotation from the motor output gear 73 to the power transfer mechanism 62. The motor 72 and the gear drive train 74 are mounted within a housing 70. In the embodiment shown in FIGS. 13–16, the housing 70 has a pair of shock absorbing elements or bumpers 96a and 96b arranged adjacent the drive gear 94. More specifically, the shock absorbing elements 96a and 96b are located on the housing 70 so as to engage the first and second contact surfaces 94a and 94b of the drive gear 94. The motor 72 drives the drive gear 94 and the drive axle 95 in both the clockwise and the counterclockwise direction between first and second end positions. In one embodiment, the end positions of the drive gear 94 are located just after contact of the contact surfaces 94a and 94b with the shock absorbing elements 96a and 96b, respectively. Alternatively, the end positions of the drive gear 94 are located just prior to contact between the contact surfaces 94a and 94b and the shock absorbing elements 96a and 96b, respectively. In another embodiment, the end positions of the drive gear 94 are located at the points of contact between the contact surfaces 94a and 94b and the shock absorbing elements 96a and 96b, respectively. The first and second shift or preset component positions of the derailleur 28 preferably correspond to the end positions of the drive train 74. Preferably, the drive gear 94 only engages the shock absorbing elements 96a and 96b when the motor 72 is energized past the normal stop positions of the drive axle 95.

While such an overrun of the motor 72 rarely occurs, the shock absorbing elements 96a and 96b protect the drive train 74 by absorbing and slowing the rotational movement of the drive train 74. More specifically, the shock absorbing elements 96a and 96b are located on the housing 70 so as to engage the first and second contact surfaces 94a and 94b of the drive gear 94. The drive gear 94 only engages the shock absorbing elements 96a and 96b when the motor 72 is energized to or past the normal stop positions of the drive axle 95.

In one embodiment of the invention, the shock absorbing elements 96a and 96b are constructed of an acrylic foam material having a thickness of approximately 1.14 millimeters in the direction of compression between the drive gear 94 and the housing 70. The shock absorbing elements 96a and 96b are preferably adhesively secured to the housing 70. For example, double-sided adhesive tape can be utilized to secure the shock absorbing elements 96a and 96b to the housing 70. The shock absorbing material can be constructed of any material that has a cushioning effect such as polyethyleneterephthalate. Alternatively, as shown in FIG. 17, the shock absorbing elements or bumpers 96a and 96b can be positioned on the ends of the drive gear 94 by adhesive such as a double-sided adhesive tape. Moreover, it will be apparent to those skilled in the art from this disclosure that the shock absorbing elements can be arranged anywhere along the drive train 74 as needed and/or desired. Moreover, the shock absorbing elements 96a and 96b can take other forms than foam-like pads as illustrated. The drive gear 94 is coupled to a drive axle 95 for rotating the drive axle 95 in either a clockwise or counterclockwise depending upon the direction of rotation of the gear 73.

Figure 19:
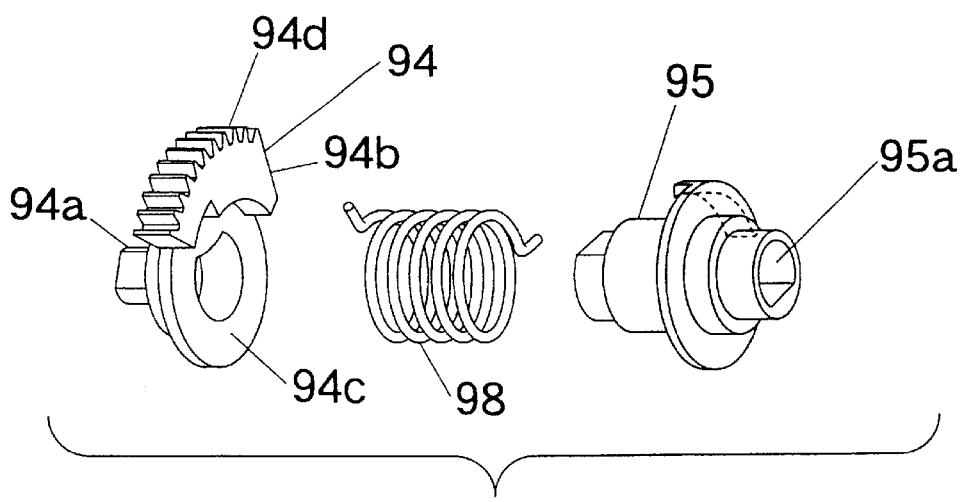
FIG. 19 is a perspective view of a portion of the drive axle of the motorized actuator of the shift assisting apparatus for the front derailleur assembly illustrated in FIGS. 3 and 4.

As best seen in FIG. 19, the drive gear 94 and the drive axle 95 have a small amount of rotational play therebetween. This rotational play is taken up by a torsion spring 98. This arrangement is designed to further protect the gears from breaking when the motor 72 locks up but the energy to the motor 72 has not been discontinued. Moreover, since the gears 91–94 cannot stop immediately due to inertia, the torsion spring 98 further protects the gears 91–94 from breaking due to such an overrun. This torsion spring 98 also protects the gears 91–94 in the case of a double shift when the rider performs a second shift before the first shift is completed. The drive axle 95 has hub portion with a center bore 95a that is coupled to the power transfer mechanism 62 as discussed below. Preferably, the bore 95a has a noncircular cross section. The drive gear 94 is a fan-shaped gear having a hub portion 94c mounted on the drive axle 95 and an arc shaped portion 94d with a plurality of teeth located between the first and second contact surfaces 94a and 94b.

Referring back to FIGS. 3 and 4, the bottom bracket 27 is operatively coupled to the shift assisting apparatus 30 according to the present invention for shifting a bicycle transmission or drive train 12. The general structure of the bottom bracket 27 is well known in the bicycle art, so a detailed description of those components shall be omitted.

Referring now to FIGS. 20–30, the power transfer mechanism 62 basically includes a drive ring 100 fixedly secured to the right crank arm 26a and a driven member 102 fixed to the outer sleeve 27a of the bottom bracket 27. Thus, the drive ring 100 rotates with the right crank arm 26a, while the driven member 102 is nonrotatably fixed to frame 14 by the bottom bracket 27. In this embodiment, the driven member 102 of the power transfer mechanism 62 can act as the base member of the front derailleur 28. Alternatively, the front derailleur 28 can be directly coupled to the bottom bracket 27, if needed and/or desired.

Referring to FIG. 4, a perspective view of the power transfer mechanism 62 is illustrated with the derailleur 28 and the crank arm 26a removed. The drive ring 100 is shown with a smooth inner peripheral surface 104 that is press-fitted on to the inner end of the crank arm 26a. Of course, the inner peripheral surface 104 can have splines that mate with corresponding splines of the crank arm 26a. Alternatively, the drive ring 100 can be fixed to the axle 27b of the bottom bracket 27. The outer peripheral surface of the drive ring 100 forms a pair of drive projections 106 with abutment surfaces 108. The abutment surfaces 108 are disposed 180° from each other and facing in the forward direction of rotation of the bottom bracket 27 and the crank arm 26a. In other words, the abutment surfaces 108 face in the clockwise direction in FIG. 4. The abutment surfaces 108 follow an imaginary straight line extending radially outwardly from the axis of rotation Y of the bottom bracket 27. The outer peripheral surface of the drive ring 100 at the location of intersection with the abutment surfaces 108 extends clockwise in FIG. 4 at a constant radius of curvature for more than 20° and, in this embodiment, more than 45° until it nears the rear of the following the drive projection 106, whereupon the radius of curvature increases in a non-curvature manner to the tip of the projection 106. In this embodiment, the outer peripheral surface of the drive ring 100 forms a flat ramp up to the tip of the corresponding projection, but it could be arcuate as well. As seen clearly in FIG. 4, the drive projections 106 extend only slightly from the outer peripheral surface of the drive ring 100. As shown FIGS. 16–21, the drive ring 100 will be illustrated as being attached to the axle 27*b* of the bottom bracket 27 to help understand the operation of the device and the crank arm 26*a* will be shown in broken lines.

The driven member 102 is designed to selectively pull or release the operating wire 56 to shift the front derailleur 28. More specifically, the rotational movement of the drive ring 100 is transferred to the driven member 102 to pull or release the operating wire 56 in response to operation of the motor 72 by the shift control unit 32. The driven member 102 basically includes a base member 120, a cover member 122, a selector arm 124, an accurate operating lever 126, a cam ring or member 128, a cam follower 130, a first pawl 132*a*, a first pawl disengagement member or ramp 132*b*, a second pawl 134*a*, and a second pawl disengagement member or ramp 134*b*. The first pawl 132*a* and the first pawl disengagement member or ramp 132*b* form a first coupling device. The second pawl 134*a* and the second pawl disengagement member or ramp 134*b* form a second coupling device.

As discussed in more detail below, the shift assisting apparatus 30 upshifts (low gear to top gear) the front derailleur 28 by moving the operating lever 126 counterclockwise and then downshifts (top gear to low gear) the front derailleur 28 by moving the operating lever 126 clockwise. The operating lever 126 moves the operating wire 56 coupled to the front derailleur 28. The shift assisting apparatus 30 is connected to the shift device 34*b* of the shifting control unit 32 located on the handlebar.

The base member 120 is preferably fixedly mounted to the bottom bracket 27 and includes a pair of mounting flanges 120*a* for movably mounting the front derailleur 28 thereto. The base member 120 has a cup-shaped portion 120*b* that houses the selector arm 124, the operating lever 126, the cam ring 128, the cam follower 130, the first pawl 132*a*, the first pawl disengagement member 132*b*, the second pawl 134*a*, and the second pawl disengagement member 134*b*. The base member 120 preferably has three threaded holes 120*c* for receiving threaded fasteners 120*d* for attaching the cover member 122 thereto.

The selector arm 124 has a first end pivotally connected to the base member 120 through a pivot shaft 136 for pivoting around an operating axis. The pivot shaft 136 has one end received in the bore 95*a* of the drive axle 95 of the motorized actuator unit 60. The second end of the selector arm 124 has a pin 124*a* that is coupled to the operating lever 126. Thus, rotation of the selector arm 124 by the motor 72 causes the operating lever 126 to move between first and second positions. In other words, the motor 72 rotates the pivot shaft 136 to operate the power transfer mechanism 62. The selector arm 124 has a limited range of movement, which stops or locks the motor 72 from operating in both directions. The two lock or stop positions are shown in FIGS. 20 and 21.

Preferably, the selector arm 124 has a range of movement of approximately 30°. In other words, the pivot shaft 136 of the selector arm 124 is rotated 30° when moved from the first position to the second position by the drive axle 95. However, the selector arm 124 only needs to move at least 6.4° to cause an upshift to occur, while the selector arm 124 needs to move 14.5° to cause a downshift to occur. This is due to the connection between the pin 124*a* of the selector arm 124 and the slot 126*a* of the operating arm 126. When the selector arm 124 is in the first or top position, the drive axle 95 can continue to rotate an additional 35° after the selector arm 128 and the pivot shaft 136 are locked in the first position. This additional 35° of movement is due to the spring connection 98 discussed above. Preferably, the drive gear 94 contacts the first shock absorbing element 96*a* after approximately 32° of rotation passed the first stop position of the actuator arm 124. When the selector arm 124 is moved from the first or top position to the second or low position, the second shock absorber 96*b* will engage the drive gear 94 just prior to the selector arm 124 reaching the second or low position. Preferably, the second shock absorbing element 96*b* is engaged after 27° of rotation, i.e., 3° prior to complete rotation of the selector arm 124. The drive axle 95 can rotate relative to the pivot shaft 136 of the selector arm 124 due to a certain degree of rotational play therebetween. This rotational play can result in 2° of additional rotational movement of the drive gear 94 against a second shock absorbing element 96*b*. As previously mentioned, energy or power to the motor 72 is preferably controlled so that the drive axle 95 stops immediately when the selector arm 124 reaches either the first or second position depending upon the direction of rotation of the motor 72. Thus, no undue strain is placed on the drive train 74. As previously mentioned, the motor 72 can be stopped via a positioning switch 76 and a positioning detecting circuit 84 that detects when the drive gear 94 has reached the first and second stop positions that correspond to the first and second positions of the selector arm 124. Alternatively, an overcurrent detecting circuit 84' could be utilized to stop the motor 74 by detecting an overcurrent occurring when the drive axle 95 begins to rotate against the biasing force of the torsion spring 98 when moving from the low position to the top position. When moving from the top position to the low position, the overcurrent will begin to occur when the drive gear 94 contacts the second shock absorbing element 96*b*, i.e., 3° prior to the selector arm 124 reaching its end position.

The accurate operating lever 126 has a first end pivotally connected to the base member 120 through a pivot shaft 140 for pivoting around an operating axis. The operating lever 126 is moved between first and second operating positions by the movement of the selector arm 124 as seen in FIGS. 20 and 21. In particular, the operating lever 126 has a slot 126*a* that receives the pin 124*a* of the selector arm 124 for transferring the rotational movement of the selector arm 124 to the operating lever 126. The operating lever 126 has a first control ledge or flange 126*b* and a second control ledge or flange 126*c* that cooperate with the first pawl 123*a* and the second pawl 134*b*, respectively, so that the cam ring 128 is selectively rotated or stopped as discussed below.

Figure 20:
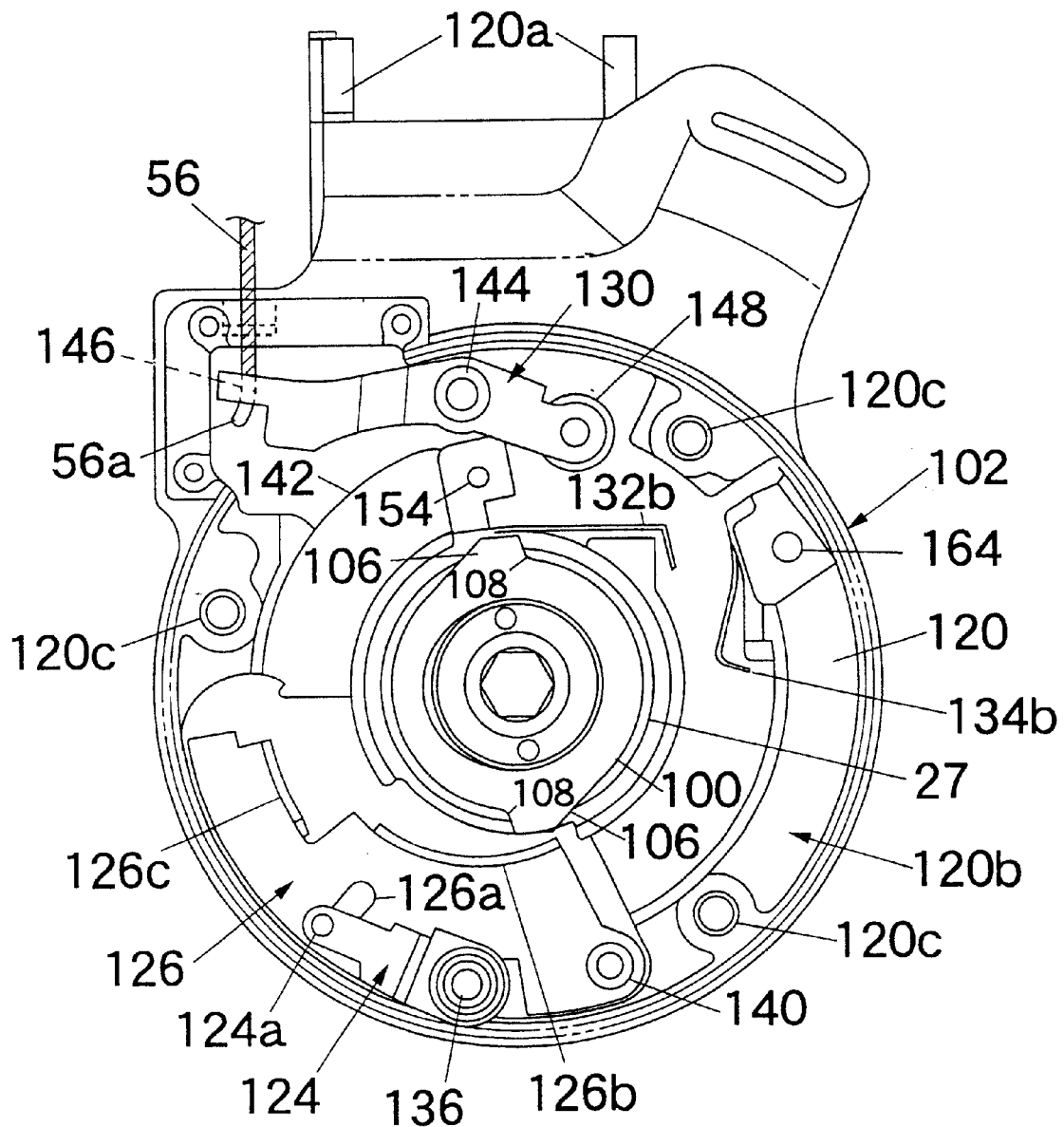
FIG. 20 is a side elevational view of the base member of the driven member for the shift assisting apparatus in which the operating lever is in the first operating position.
Figure 21:
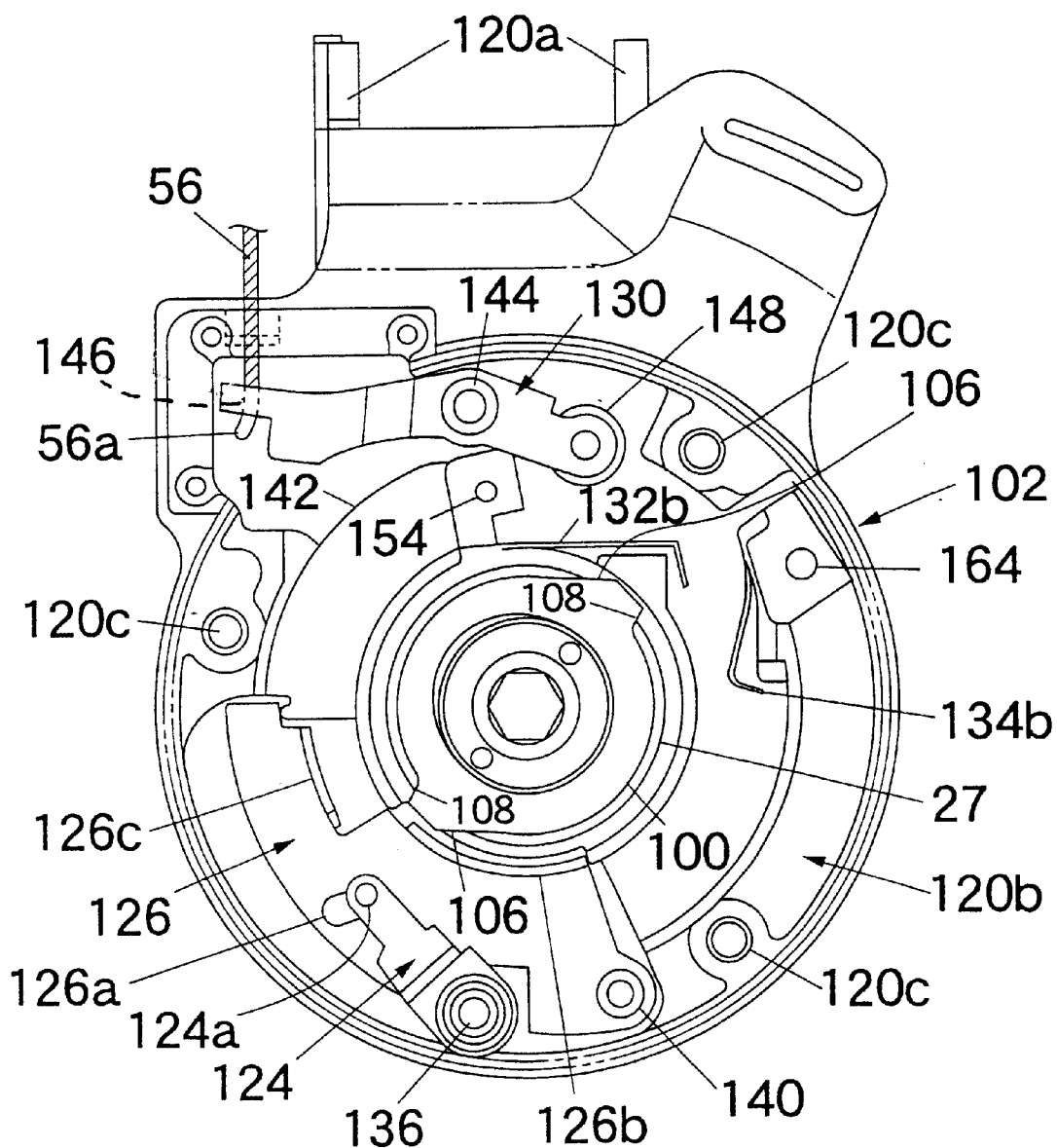
FIG. 21 is a side elevational view of the base member of the driven member for the shift assisting apparatus in which the operating lever is in the second operating position.
Figure 22:
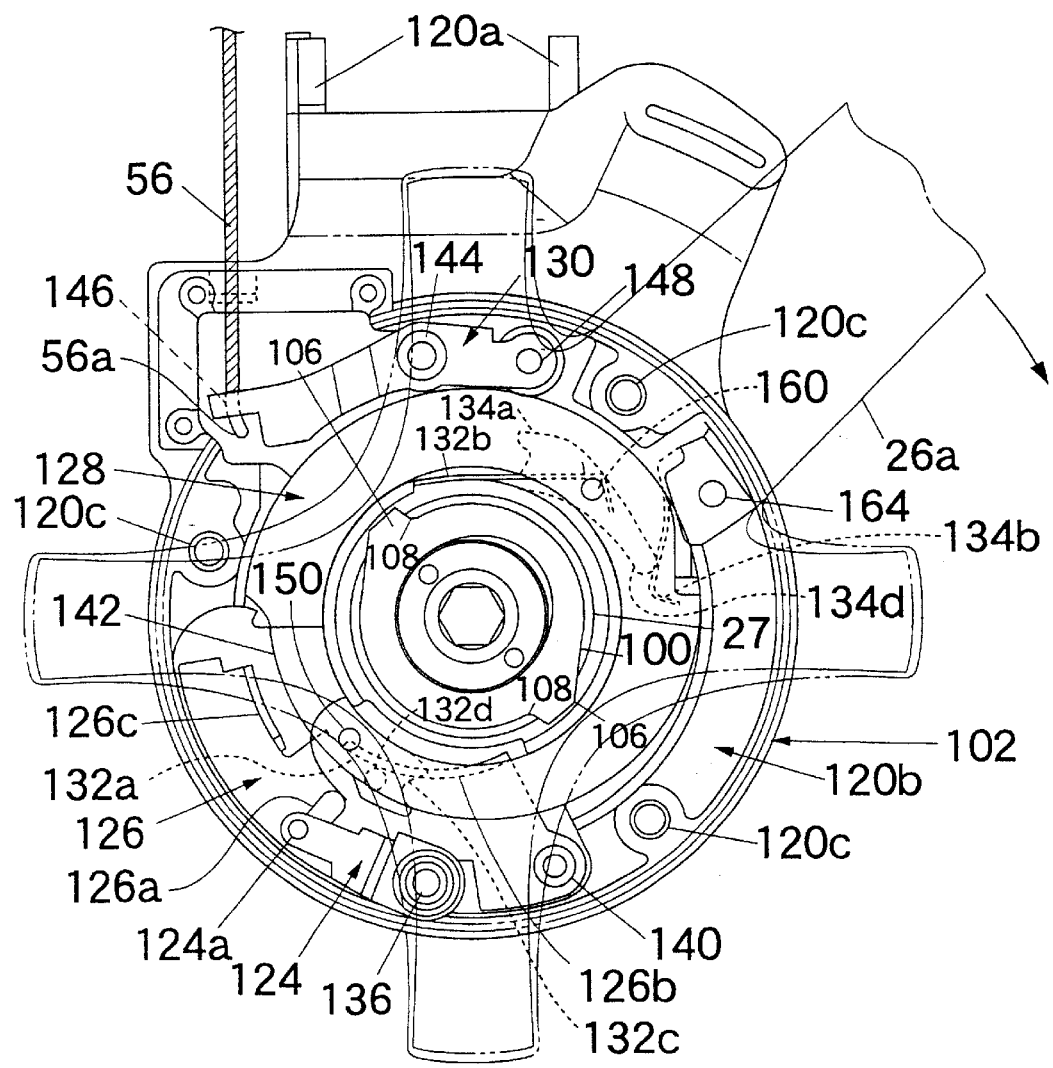
FIG. 22 is a side elevational view of the shift assisting apparatus illustrated in FIGS. 3 and 4, with the driven member in an idle state and the derailleur in a top position.
Figure 23:
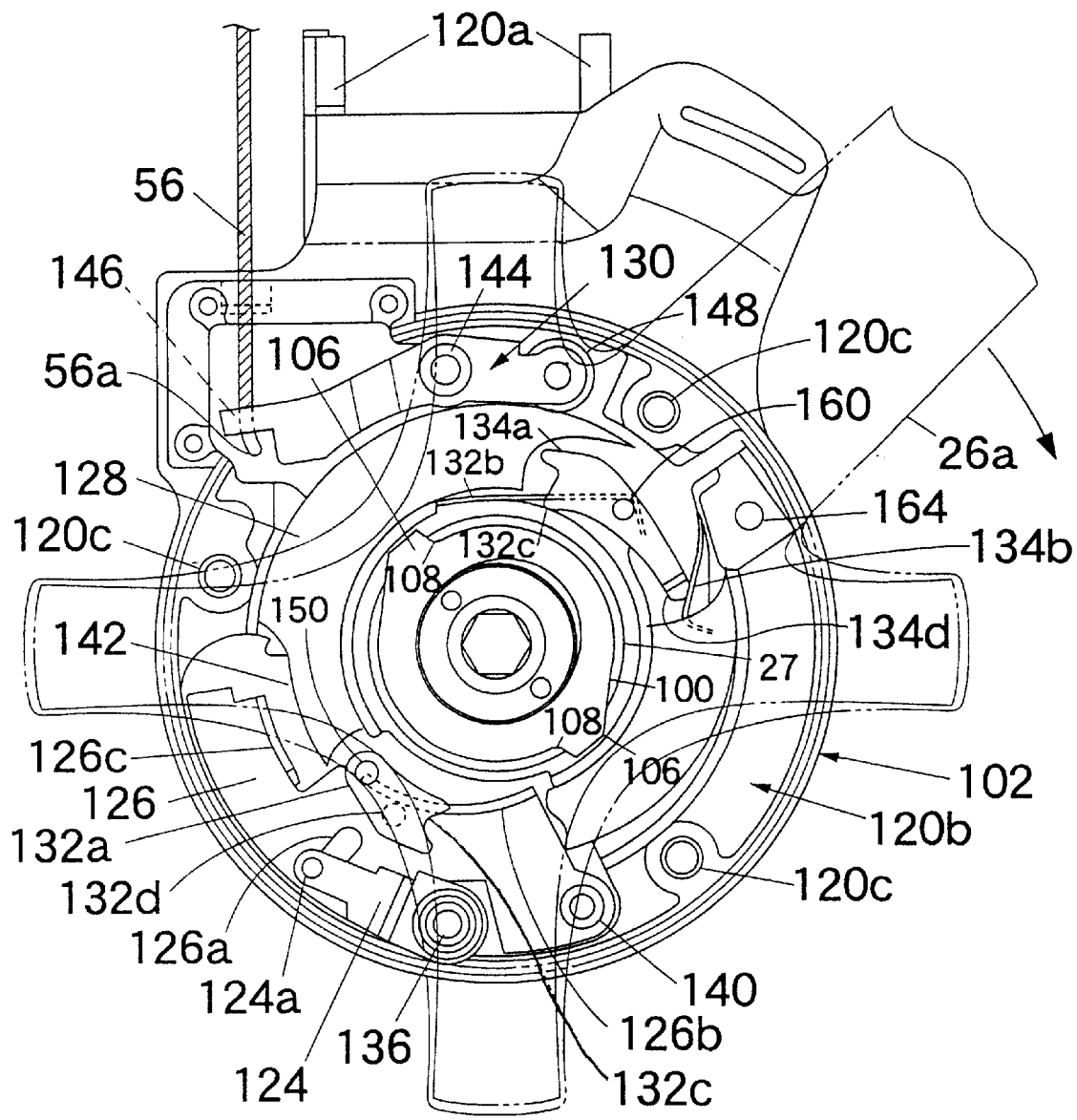
FIG. 23 is a side elevational view of the shift assisting apparatus illustrated in FIGS. 3 and 4, with the driven member in an idle state and the derailleur in a top position, similar to FIG. 22, but with portions of the cam ring broken away for illustrating the first and second pawls.

When the selector arm 124 is in a first position as seen in FIG. 20, the derailleur 28 is in a top position with the drive member 100 disengaged from the driven member 102. In other words, the cam ring 128 is not rotating with the drive ring 100. When the motor 72 is actuated, the drive train 74 causes the pivot shaft 136 to rotate the selector arm 124 which in turn rotates the operating lever 126 around the pivot shaft 140 to the second position shown in FIG. 21.

As shown in FIG. 16, the cam ring 128 has a peripheral cam surface 142 that moves the cam follower 130 which in turn pulls or releases the operating wire 56. The cam ring 128 is rotatably mounted with the base member 120 for rotation around the axis Y shown in FIG. 4.

The cam follower 130 is pivotally mounted to the base member 120 through a pivot shaft 144. A first end of the cam follower 130 has an opening 146 for attaching the operating wire 56 thereto. A second end of the cam follower 130 includes a roller 148 for engaging the cam surface 142. The derailleur operating wire 56 has a wire end bead 56a for preventing the derailleur operating wire 56 from being pulled upwardly out of the opening 146.

The first pawl 132a is fixedly coupled for rotation relative to the cam ring 128, such that the first pawl 132a moves between a first engaged position and a first disengaged position. The second pawl 134a is also fixedly coupled for rotation relative to the cam ring 128, such that the second pawl 134a moves between a second engaged position and a second disengaged position. The first and second pawls 132a and 134b are fixed 180° apart on the cam ring 128. When the cam ring 128 rotates around the axis Y, the first and second pawls 132a and 134b rotate therewith.

Regarding the second pawl 136a, a first end of the first pawl 132a is pivotally connected to the cam ring 128 through a first pivot shaft 150, and a second end of first pawl 132a has a radially inwardly extending first pawl tooth 132c. A first pawl control abutment or pin 132d is located in a central portion of the first pawl 132a. A first torsion spring or biasing member (not shown) is mounted on pivot shaft 150 with one end of the torsion spring (not shown) fixed to the cam ring 128 and the other end of the first torsion spring (not shown) fixed to the first pawl 132a. The first torsion spring (not shown) biases the first pawl 132a in the counterclockwise direction so that the first pawl tooth 132c is normally biased in radially inwardly to a first engaged position such that the first pawl 132a engages either of the two abutment surfaces 108 of the drive ring 100 as discussed below. The first disengagement device 132b is preferably in the form of a first leaf spring that has a first end fixedly coupled to the base member 120 via a fastener 154.

Regarding the second pawl 136a, an intermediate portion of the second pawl 136a is pivotally connected to the cam ring or member 128 through a second pivot shaft 160. A first end of the second pawl 136a has a radially inwardly extending second pawl tooth 136c, and a second end of the second pawl 136a has second pawl control abutment 136d. A second torsion spring or biasing member (not shown) is mounted on the second pivot shaft 160 with one end of the second torsion spring (not shown) fixed to the cam ring 128 and the other end of the second torsion spring (not shown) fixed to the second pawl 136a. The second torsion spring (not shown) biases the second pawl 136a in a counterclockwise direction. The second disengagement member 136b is preferably in the form of a second leaf spring that has a first end fixedly coupled to the base member 120 via a fastener 164. The second torsion spring (not shown) biases the second pawl tooth 136c radially inwardly to a second engaged position such that the second pawl 136a engages either of the two abutment surfaces 108 of the drive ring 100 as discussed below.

The operation of the shift assisting apparatus 30 can be understood by referring to FIGS. 22–30. When the operating lever 126 moves from the first position (FIG. 20) to the second position (FIG. 21), then the operating lever 126 hits the base member 120. At this point, either the position switch 76 detects the position of the drive shaft 95 or the overcurrent detecting circuit 84 detects an overcurrent occurs. In either case, a signal is produced to stops electricity to the motor 72. Then, the electrical step is finished. Likewise, when the operating lever 126 moves the second position (FIG. 21) to the first position (FIG. 20), the operating lever 126 hits the base member 120 At this point, either the position switch 76 detects the position of the drive shaft 95 or the overcurrent detecting circuit 84 detects an overcurrent occurs. In either case, a signal is produced to stops electricity to the motor 72. Then, the electrical step is finished. As seen in FIG. 18, the position switch 76 is in the form of a potentiometer that includes a printed circuit board 76a fixedly mount to the housing 70 and a moving detecting blade 76b fixedly coupled to the drive gear 94. Thus, when the drive gear 94 rotates, the detecting blade 76b rotates with the drive gear 94. The detecting blade 76b has a magnet 76c fixed thereto that is detected by contacts on the printed circuit board 76a. In other words, the contacts on the printed circuit board 76a detect when the drive gear 94 and the detecting blade 76b rotate to the stop positions. When the drive gear 94 and the detecting blade 76b reach the stop positions, the printed circuit board 76a sends a signal to the microprocessor 80 via the position detecting circuit 84.

FIG. 20 shows the shift assisting apparatus 30 in a steady-state idle condition with the front derailleur 28 in the top position. In this initial condition, the first pawl control surface of the first pawl control ledge 126b supports the first pawl control abutment or pin 132d so that the first pawl tooth 132c is held radially outwardly in its first disengaged position, and the second pawl ramp 136b presses the second pawl control abutment 136d radially inwardly so that the second pawl tooth 136c is held radially outwardly in its second disengaged position. Thus, the drive ring 100 rotates together with the axle 27b without having any effect on the shift assisting apparatus 30.

Now, if the rider wishes to downshift from the top position to the low position, the rider pushes the downshift button of the shift device 34b, which causes the shifting unit 32 to send a signal to operate the motor 72. When the motor 72 is actuated, the drive train 74 causes the pivot shaft 136 to rotate the selector arm 124 which in turn rotates the operating lever 126 around pivot shaft 140 in a clockwise direction as seen in FIG. 24.

Figure 24:
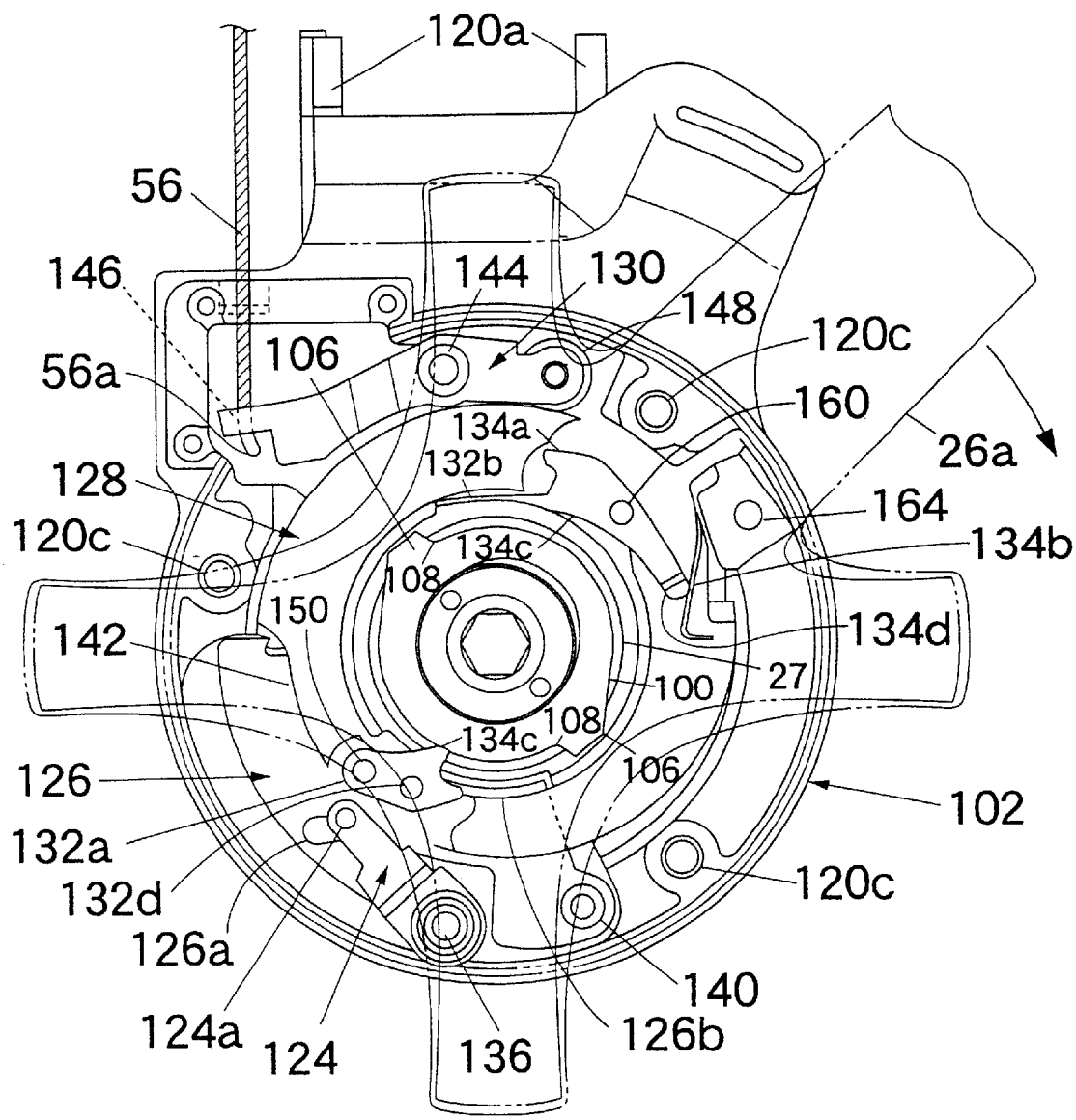
FIG. 24 is a side elevational view of the shift assisting apparatus illustrated in FIGS. 3 and 4 when the operating lever has been moved to the second operating position so that the first pawl moves radially inwardly to engage the drive member.
Figure 25:
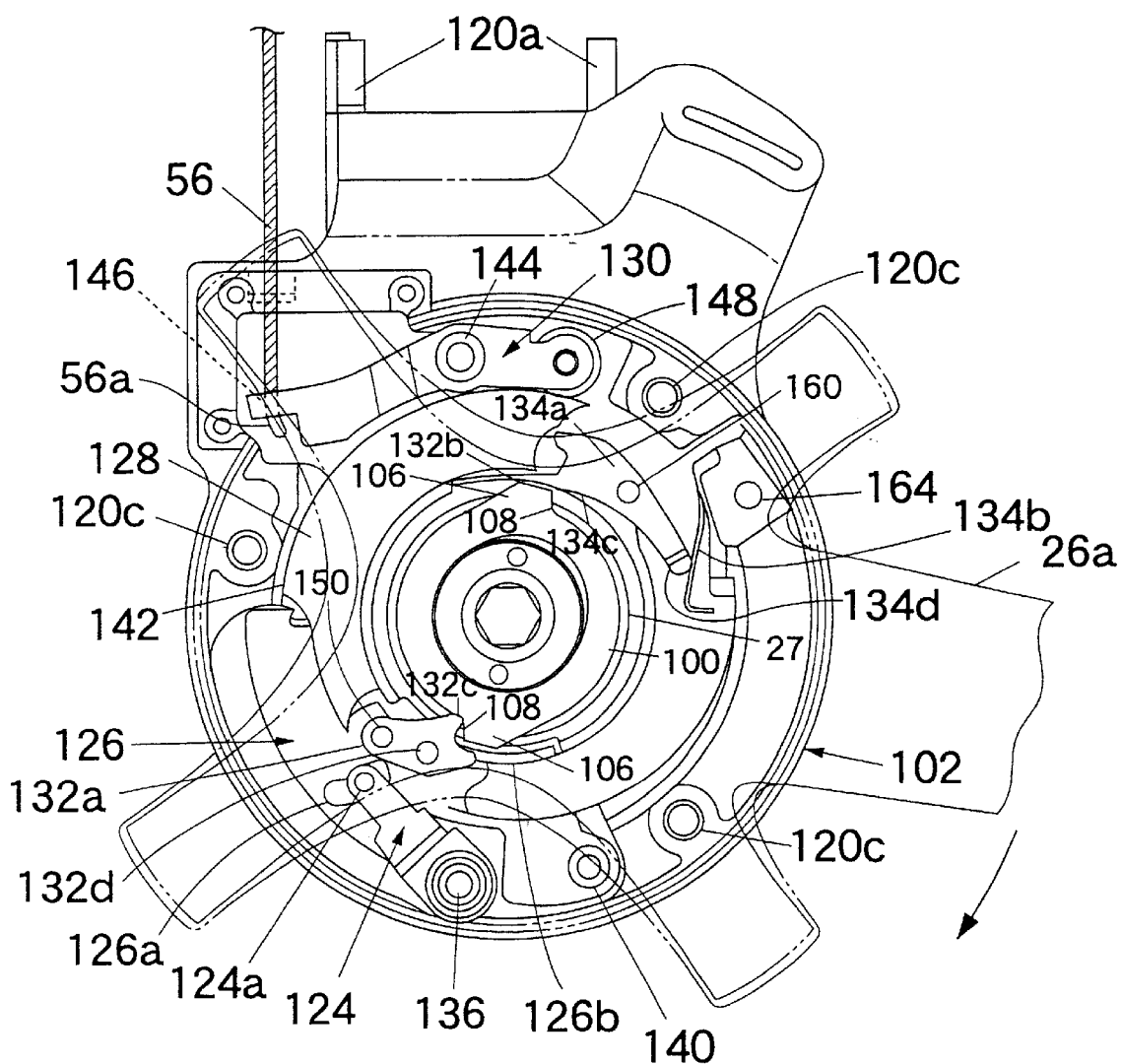
FIG. 25 is a side elevational view of the shift assisting apparatus illustrated in FIGS. 3 and 4 when the drive axle is rotated in a first direction so that the drive member contacts the first pawl to rotate the cam ring.
Figure 26:
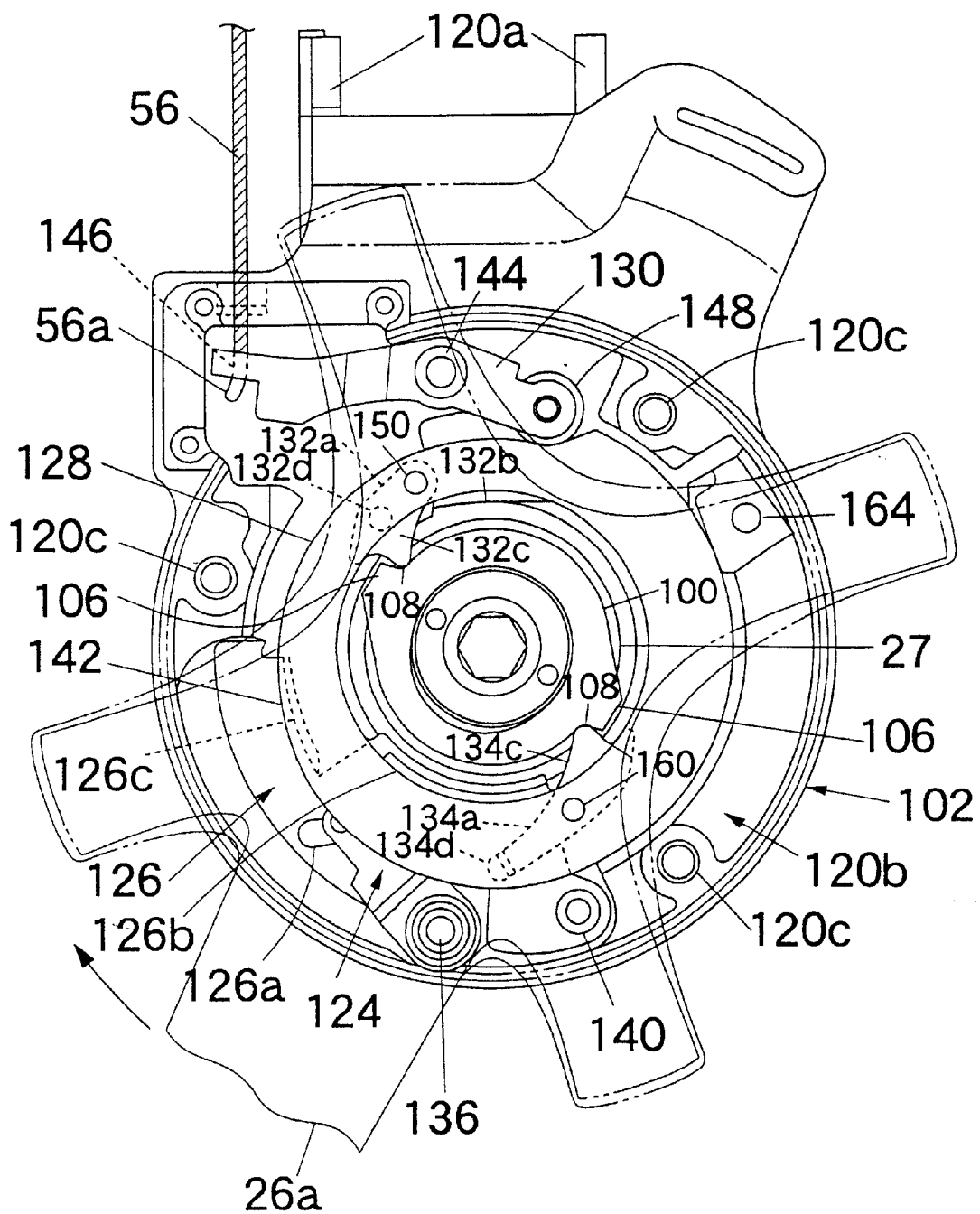
FIG. 26 is a side elevational view of the shift assisting apparatus illustrated in FIGS. 3 and 4 showing the derailleur positioning cam ring rotated to the downshift position for releasing the derailleur operating wire.
Figure 27:
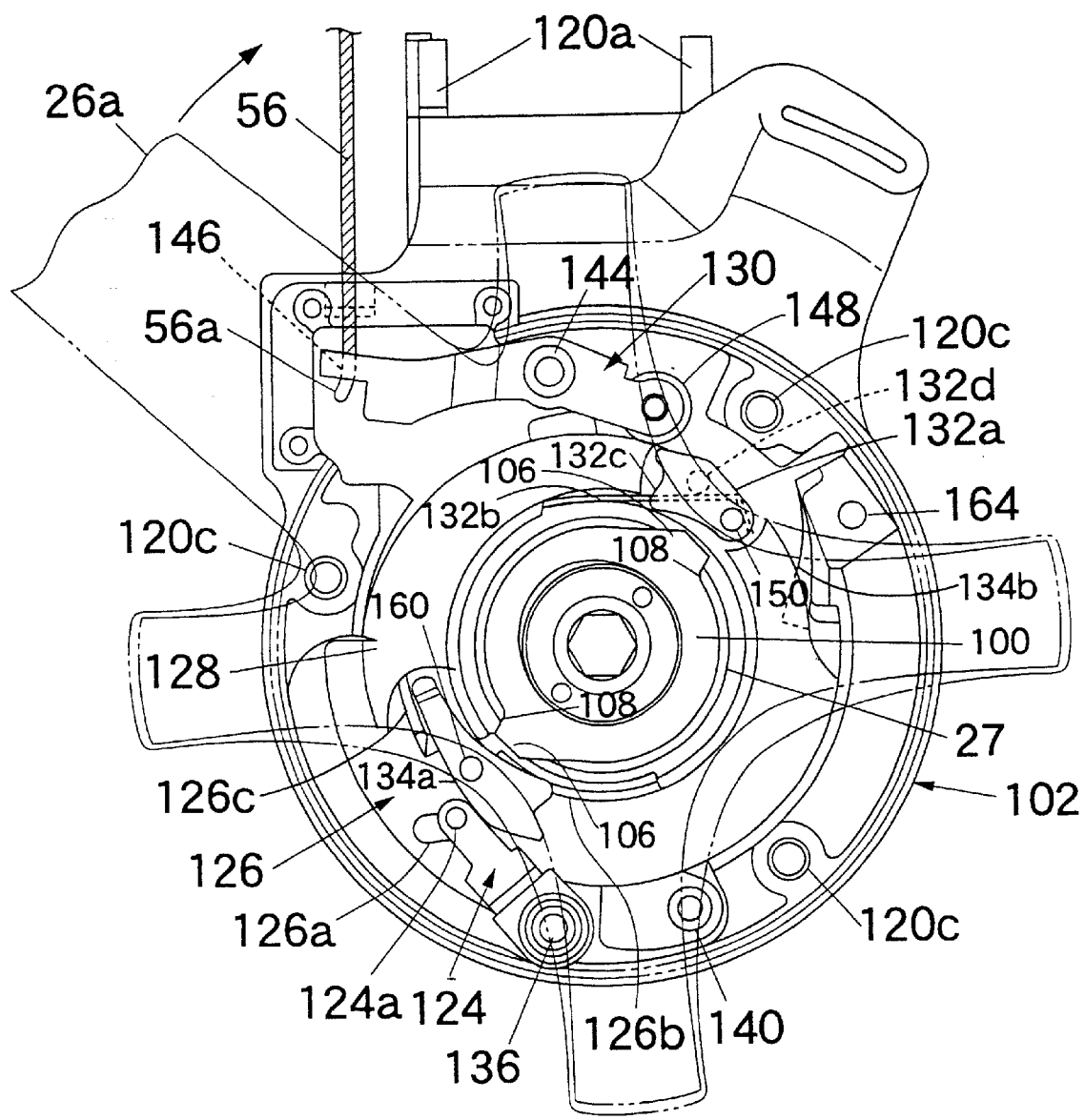
FIG. 27 is a side elevational view of the shift assisting apparatus illustrated in FIGS. 3 and 4 when the shift assisting apparatus has completed the shifting operations from the top position to the low position.

When the operating lever 126 is in this second operating position as seen in FIG. 24, a downshifting operation is activated. Thus, the first and second control ledges 126b and 126c are moved inwardly to a second operating position. More specifically, the first control ledge 126b moves inwardly so that the first pawl 132a can pivot in a counterclockwise direction under the force of the first spring 152. In this position, the first pawl 132a is arranged so that the first pawl tooth 132c can be engaged by one of the projections 106 of the drive ring 100. Accordingly, as seen in FIG. 25, the drive ring 100 contacts the first pawl tooth 132c of the first pawl 132a which causes the cam ring 128 to rotate in a clockwise direction. This clockwise movement of the cam ring 128 causes the cam roller 148 of the cam follower 130 to engage the area of the cam surface 140 that is closest to the rotation axis Y as seen in FIG. 26. Thus, the cam follower 130 can rotate in a clockwise direction about the pivot shaft 144. This clockwise rotation of the cam follower 130 causes the operating wire 56 to be released. The slack in the operating wire 56 is taken up by the biasing member (not shown) in the linkage assembly 48 of the front derailleur 28. After rotating 180° as seen in FIG. 27, the first pawl 132a is moved to a disengaged position such that the tooth of the first pawl 132a can no longer be driven by the drive ring 100. More specifically, the first pawl disengagement member 136b engages the pin 132d of the first pawl 132a to rotate the first pawl 132a in a clockwise direction around the pivot shaft 150 against the force of the biasing member 152. During this rotation of the cam ring 128, the second pawl 136a is now moved 180° so as to engage the second control ledge 126c of the operating lever 126 as seen in FIG. 27. Accordingly, the second pawl 136a is now held in a disengaged position similar to the first pawl 132a so that the drive ring 100 moves without operating the driven member 102, i.e., without rotating the cam ring 128.

Figure 28:
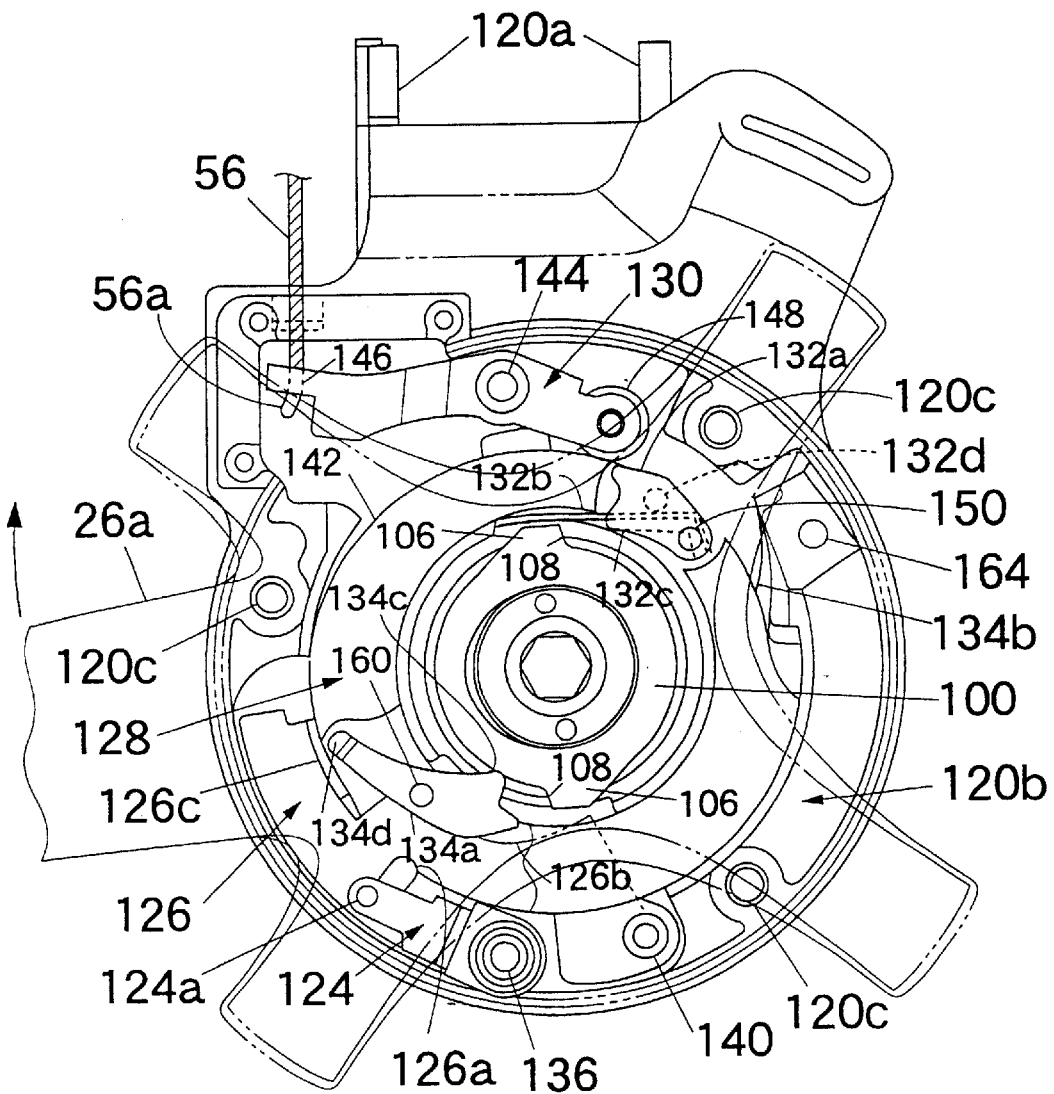
FIG. 28 is a side elevational view of the shift assisting apparatus illustrated in FIGS. 3 and 4 when the drive axle is rotated in a second direction to move the operating lever to the first operating position so that the second pawl moves to engage the drive member.
Figure 29:
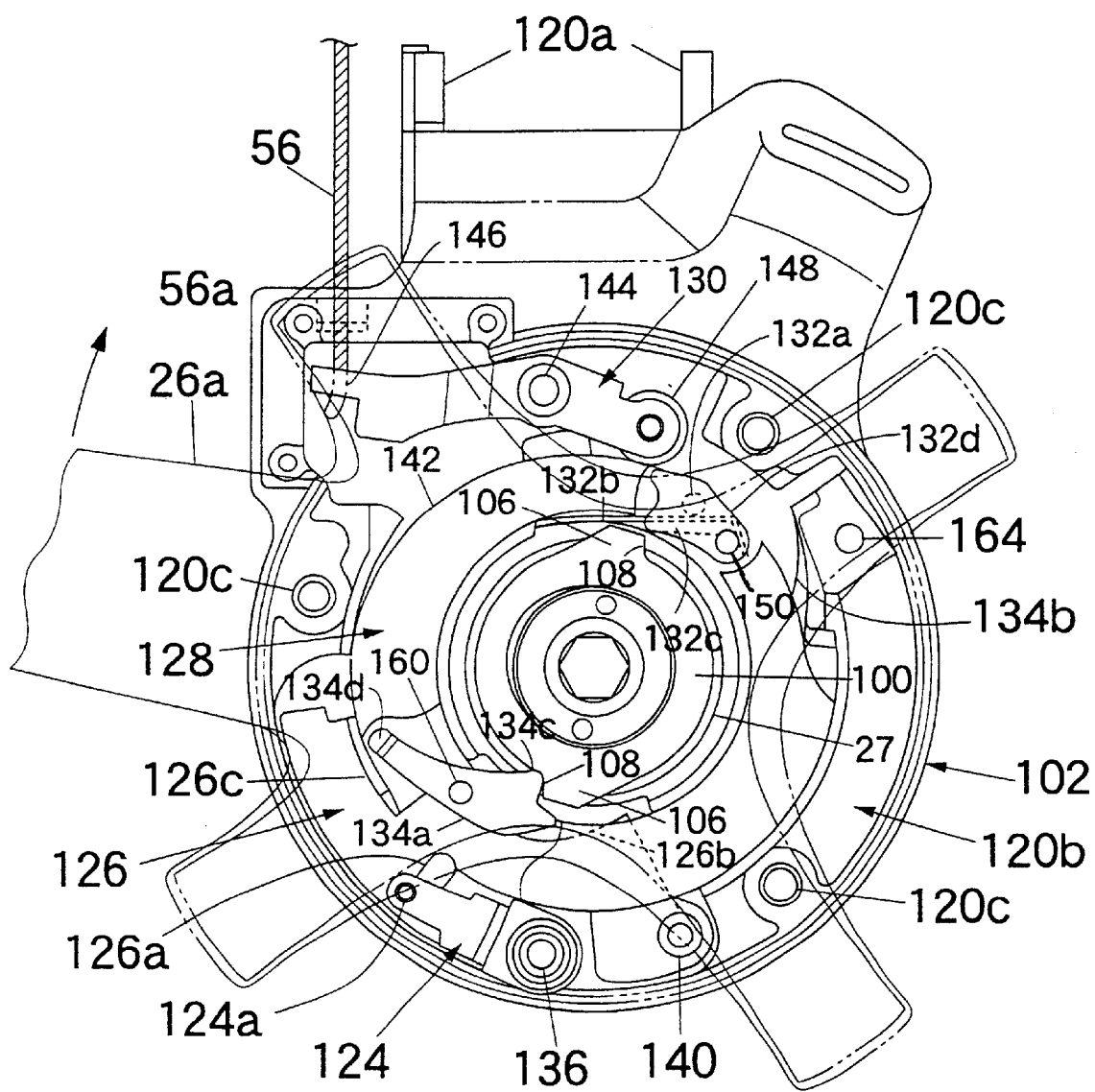
FIG. 29 is a side elevational view of the shift assisting apparatus illustrated in FIGS. 3 and 4 showing the drive member contacting the second pawl to rotate the cam ring for performing an upshift from the low position to the top position.
Figure 30:
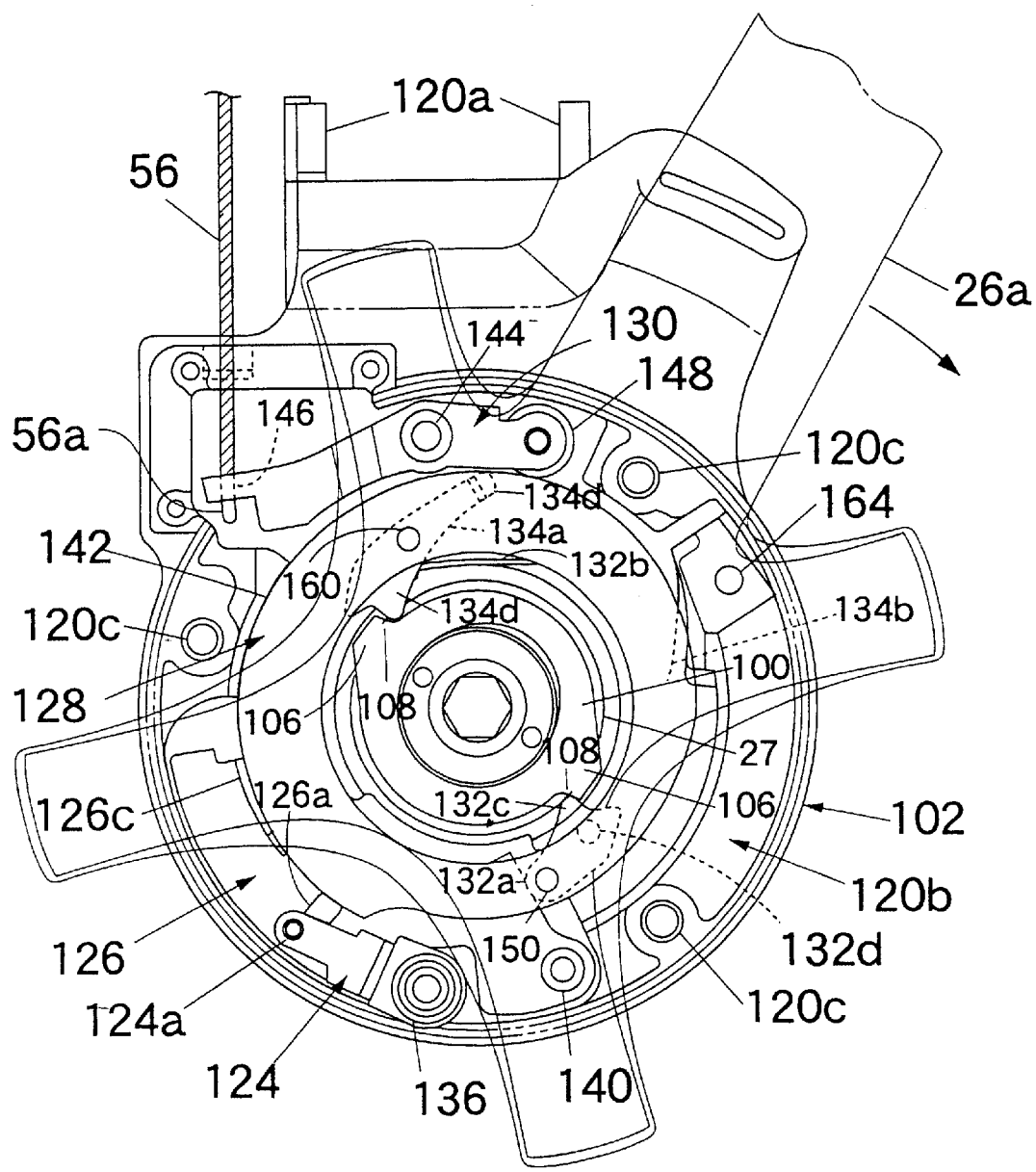
FIG. 30 is a side elevational view of the shift assisting apparatus illustrated in FIGS. 3 and 4 showing the derailleur positioning cam ring rotated to the upshift position for pulling the derailleur operating wire to complete the upshifting operations.

Now, if the rider wishes to upshift from the low position (FIG. 27) to the top position (FIG. 22 or 23), the rider pushes the upshift button of the shift device 34b which causes the shifting unit 32 to send a signal to operate the motor 72. Operation of the motor 72 causes the pivot shaft 136 to rotate in a counterclockwise direction as seen in FIG. 28. This rotation of the pivot shaft 136 causes the selector arm 124 and the operating lever 126 to move to the first operating position as seen in FIGS. 28–30.

When the operating lever 126 is in this first operating position (FIG. 28), an upshifting operation is activated. Specifically, the second control ledge 126c is moved radially outwardly so that the second pawl 136a can rotate in a counterclockwise direction under the force of its second biasing member or spring 162. Thus, the second pawl tooth 136c of the second pawl 136a is moved radially inwardly to engage one of the projections 106 of the drive member 100 as seen in FIG. 29. The cam ring 128 is now rotated 180° by the drive member 100 to the position shown in FIG. 22. More specifically, the drive member 100 engages the second pawl 136a, which is fixed to the cam ring 128, so that the cam ring 128 rotates with the drive member 100. Upon 180° of rotation, the second pawl 136a engages the second pawl disengagement member or spring 136b that causes the second pawl 136a to rotate in a clockwise direction against the force of its biasing member 162. Thus, the second pawl tooth 136c of the second pawl 136a is now in the second position so that the drive member 100 can freely rotate without engaging the second pawl tooth 136c of the second pawl 136a. Moreover, the first pawl 132a is also simultaneously moved radially outwardly by the first control ledge 126b of the operating lever 126. Specifically, as the cam ring 128 rotates, the first pawl control abutment or pin 132d of the first pawl 132a engages the radially outwardly facing surface of the first control ledge 126b so that the first pawl 132a is rotated in a clockwise direction against the biasing force of its spring 152. More specifically, the first control ledge 126b is arranged to form a ramp that gradually moves the pin 132d of the first pawl 132a radially outwardly as the cam ring 128 rotates in a clockwise direction. This movement of the cam ring 128 causes the roller 148 of the cam follower 130 to engage the portion of the peripheral cam surface 142 that is farthest from the center rotation axis Y. Thus, the cam follower 130 is rotated in a counterclockwise direction around the pivot shaft 144 so that the operating wire 56 is pulled. This movement of the operating wire 56 causes the derailleur 28 to move from the low position to the top position as explained above.

Figure 31:
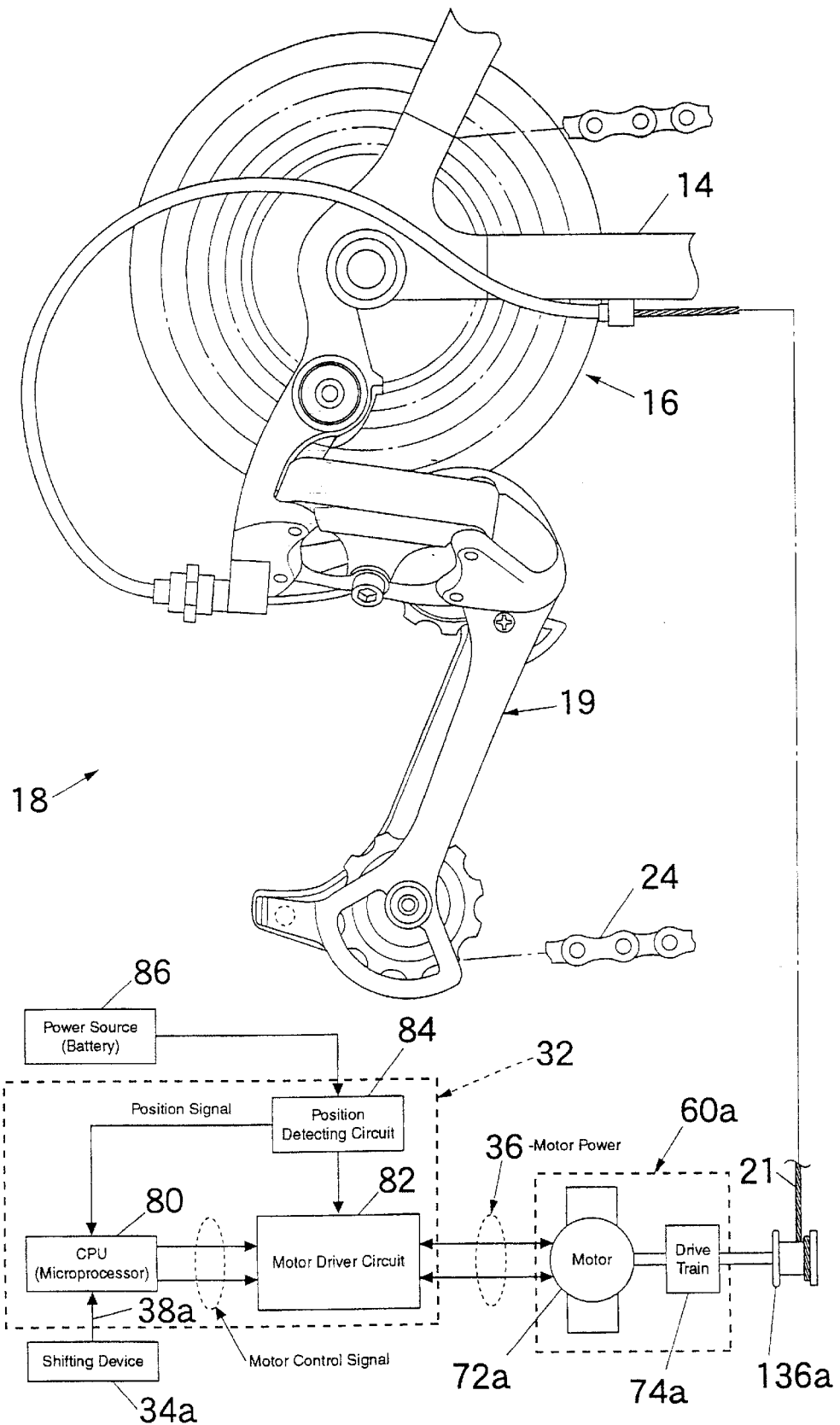
FIG. 31 is a schematic diagram illustrating a motorized rear derailleur being operated by a motor using a position detecting circuit in accordance with another embodiment of the present invention.
Figure 32:
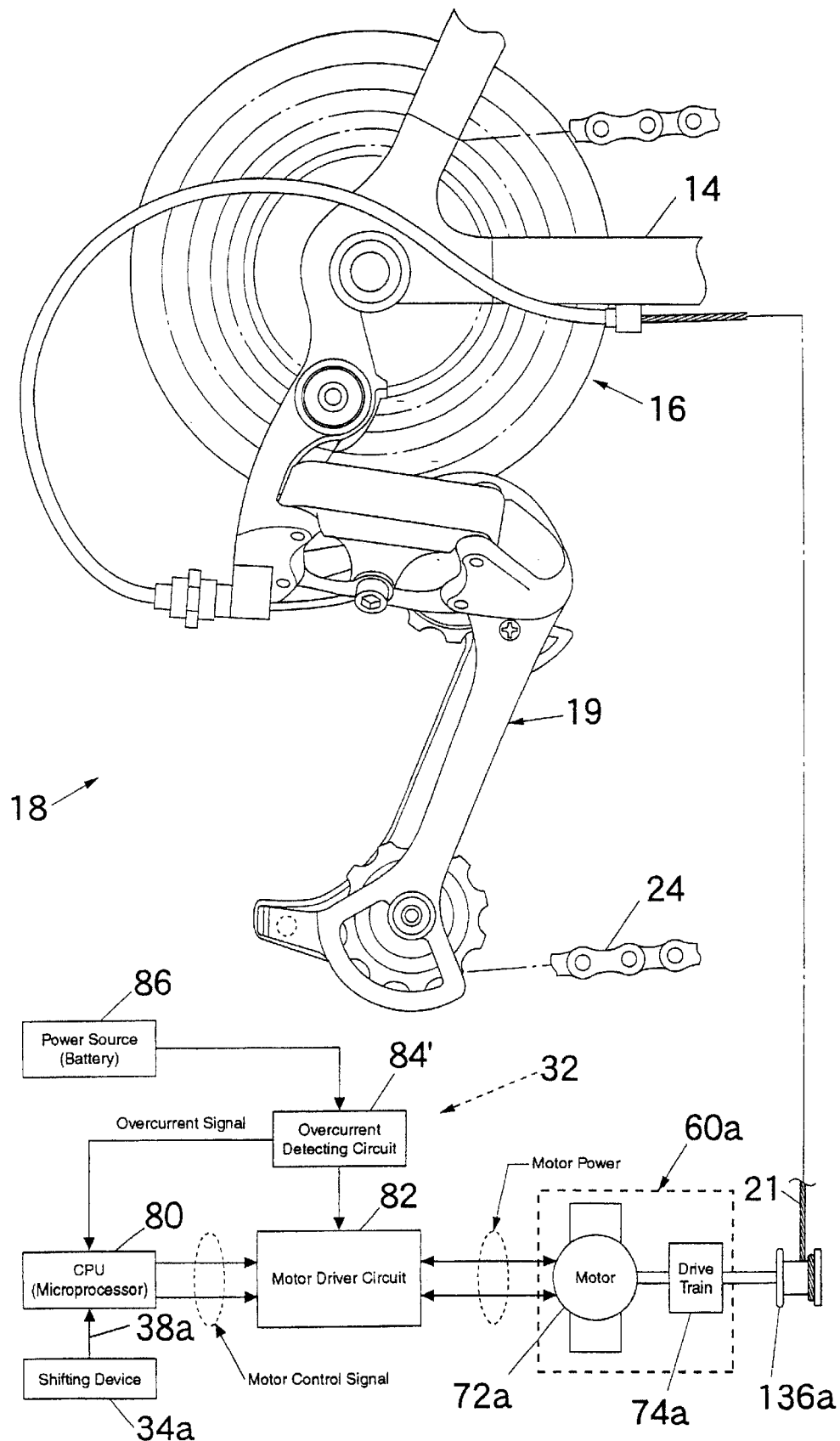
FIG. 32 is a schematic diagram illustrating a motorized rear derailleur being operated by a motor using an overcurrent detecting circuit in accordance with another embodiment of the present invention.

FIGS. 31 and 32

Referring now to FIGS. 31 and 32, the motorized rear derailleur assembly 18 will now be explained. Basically, the motorized rear derailleur assembly 18 includes a rear derailleur 19 operated by a second actuator unit 60a to move the rear derailleur 19 laterally relative to the bicycle frame 14 between the various gear positions. The second actuator unit 60a has a second motor 72a and a second drive train 74a that are operatively coupled to the rear derailleur 19 to move the rear derailleur 19 laterally relative to the bicycle frame 14 between the various gear positions.

The second actuator unit 60a is identical in construction to the actuator unit 60, discussed above. Thus, the second motor 72a and the second drive train 74a are identical to the motor 72 and the drive train 74, respectively. However, in this embodiment, the drive train 74 has a pulley 136a operatively coupled to the drive gear instead of the pivot shaft 136 that operates the power transfer mechanism 62. The pulley 136a winds or unwinds the operating wire 21 of the rear derailleur 19 to shift the rear derailleur 19. Thus, in view of the fact that the rear derailleur 19 and the shift assisting apparatus 30 both used the same actuator unit and the same motor with shock absorbing elements, the operations and descriptions of the parts of the second actuator unit 60a and the second motor 72a will be omitted for the sake of brevity. Moreover, the precise structure of the rear derailleur 19 is not important to the present invention as well as the precise structure of the power transfer mechanism between the rear derailleur 19 and the motor 72a. In other words, it will be apparent to those skilled in the art that the present invention can be used in any motor that operates a rear derailleur.

The rear derailleur 19 is preferably a conventional rear derailleur that is cable operated. The electronic control system 31 is used to operate the second actuator unit 60a, i.e., the second motor 72a and the second drive train 74a, which in turn operates the rear derailleur 19. More specifically, the second actuator unit 60a operates such that the rotational force of the second motor 72a pulls or releases the operating wire 21 of the rear derailleur 19. The second actuator unit 60a is operatively coupled to the shift control unit 32 via the electrical control cord 36 and to the shifting device 34a via the electrical cord 38a for receiving the upshift and downshift signals. Thus, the operation of the rear derailleur 19 is basically the same as the operation of the front derailleur 23, discussed above.

Referring to FIG. 31, similar to the motor 72 of the shift control unit 32, the motor 72a of the actuator unit 60a is electrically connected by the electrical cord 36 to the shift control unit 32 which has the microcomputer 80 with the motor driver circuit 82 as mentioned above. Thus, the position detecting circuit 84 is operatively coupled to the central processing unit of the microcomputer 80 and/or the motor driver circuit 82 for stopping the motor 72a. In this embodiment, the position control device or switch detects the position of drive axle of the gear drive train 74a to send a signal to stop the motor 72a.

Alternatively, as seen in FIGS. 9 and 32, the position detecting circuit 84 can be replaced with an overcurrent detecting circuit 84' is operatively coupled the central processing unit of the microcomputer 80 and/or the motor driver circuit 82 for stopping the motor 72a in the same manner as the motor 72.

When the position detecting circuit 84 is used, the predetermined end positions of the gear drive train 74a are detected by the position control device or switch to stop the movement of the motor 72a in the same manner as the motor 72. When the overcurrent detecting circuit 84' is used, the central processing unit of the microcomputer 80, the motor driver circuit 82 and the overcurrent detecting circuit 84' operate together to stop the movement of the motor 72a upon detection of the motor 72a beginning to lock up in the same manner as the motor 72.

As seen in FIGS. 5 and 6, the microcomputer 80 has a control program, which receives drive axle stop position and signal from the position detecting circuit 84 for controlling the operation of the motor 72*a*. More specifically, when the rider pushes a button on the shifting device 34*a* to start a shifting operation, the microcomputer 80 will then send a signal to the motor driver circuit 82 to have the power source or battery 86 energize the motor 72*a* in the desired direction. The motor 72*a* is preferably a reversible motor that can be driven in either a clockwise or a counterclockwise direction so as to move the derailleur 19 between various shift or preset component positions. The position detecting circuit 84 will stop energizing the motor 72*a* when the derailleur 19 reaches the new position in accordance with the signal sent by the position control switch.

Alternatively, when the motor 72*a* begins to lock up, this will increase the current level such that an overcurrent signal is sent from the overcurrent detecting circuit 84' back to the central processing unit of the microcomputer 80 to stop the electricity from energizing the motor 72*a*.

Figure 33:
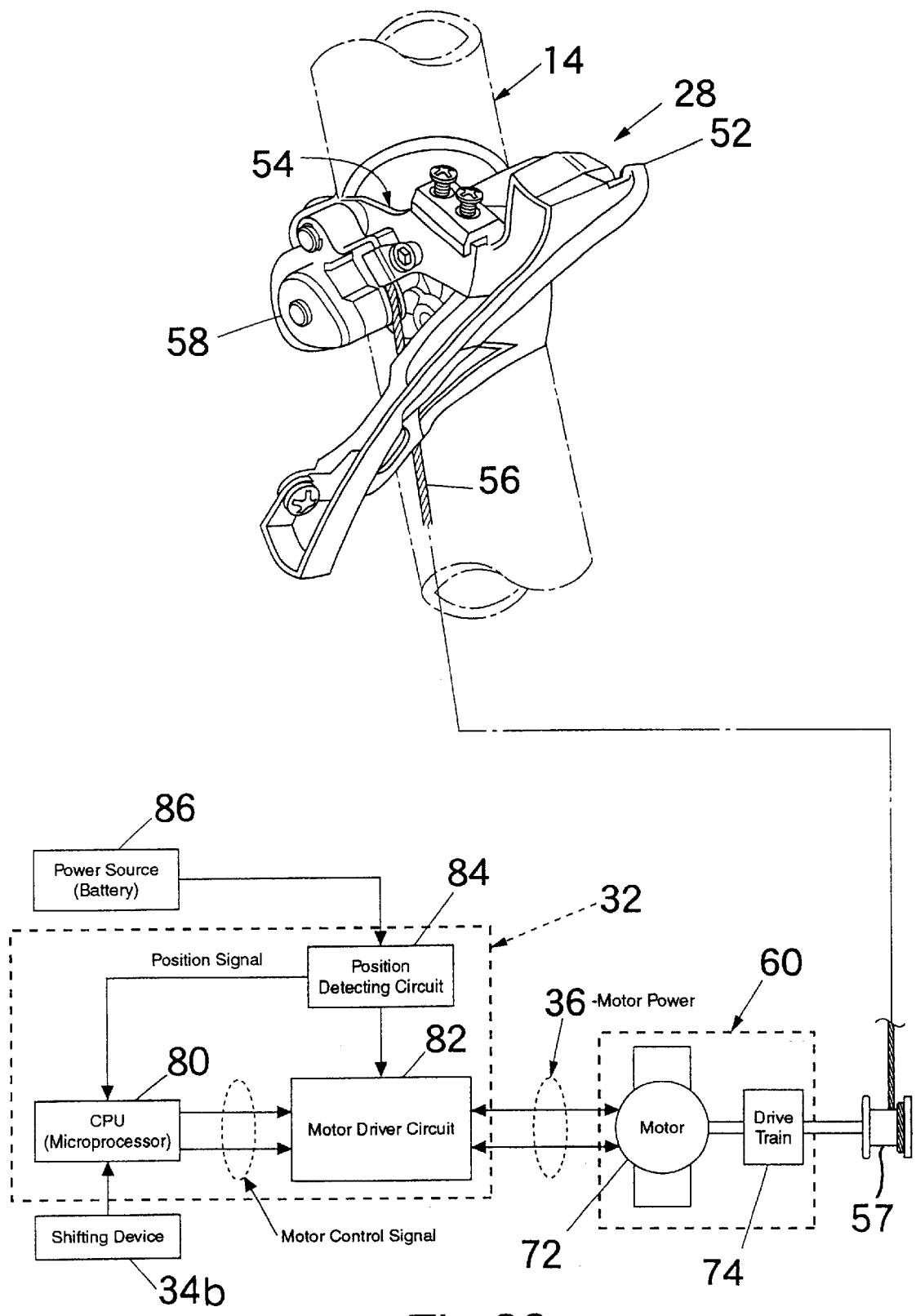
FIG. 33 is a schematic diagram illustrating a motorized front derailleur being operated by a motor using a position detecting circuit in accordance with another embodiment of the present invention.
Figure 34:
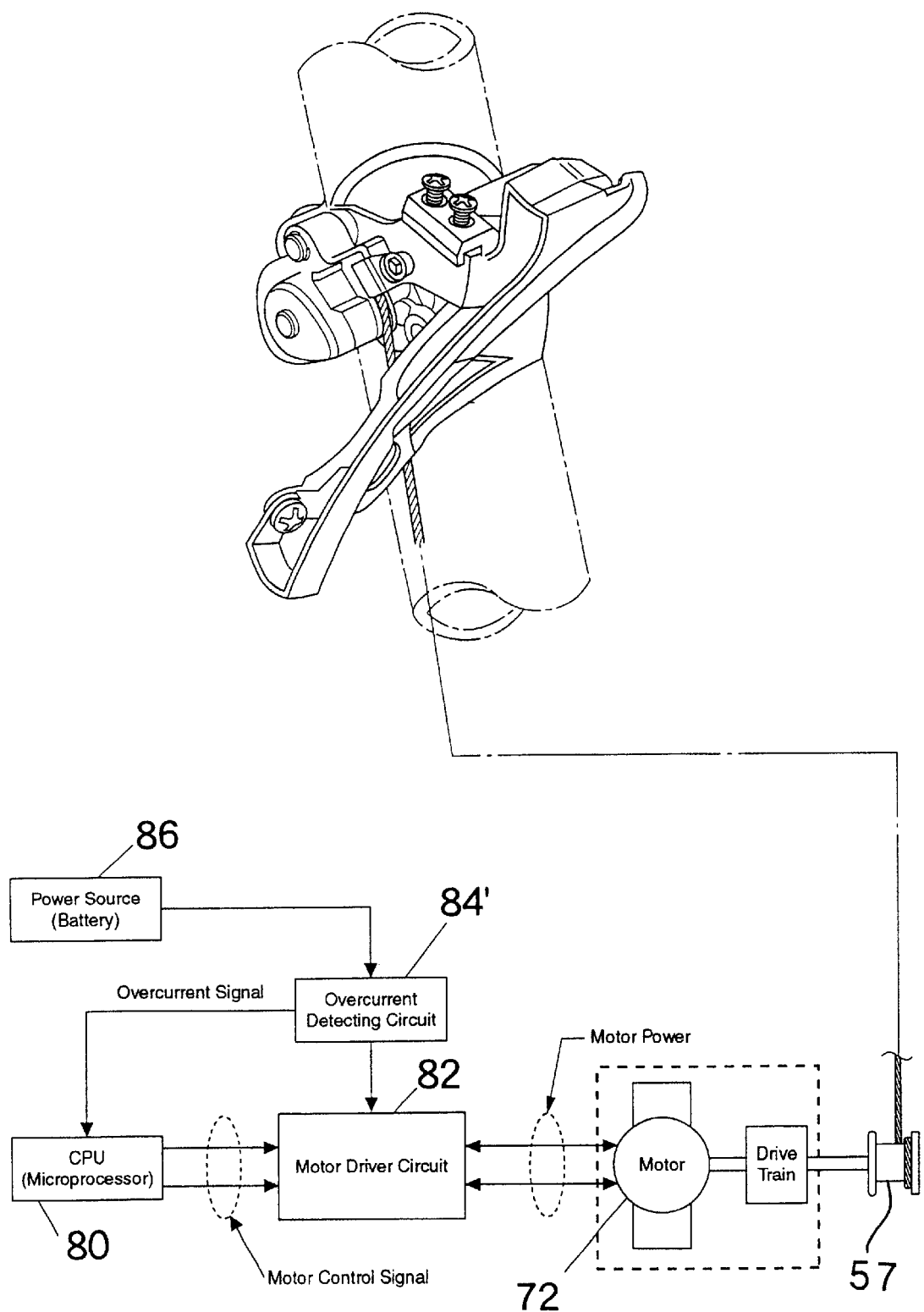
FIG. 34 is a schematic diagram illustrating a motorized front derailleur being operated by a motor using an overcurrent detecting circuit in accordance with another embodiment of the present invention.

FIGS. 33 and 34

Referring now to FIGS. 33 and 34, an alternate embodiment is illustrated in which the shift assisting apparatus 30 has been removed such that the motor 72 is operatively coupled moves the operating wire 56 coupled to the front derailleur 28 via a pulley 57. The pulley 57 winds or unwinds the operating wire 21 of the rear derailleur 19 to shift the front derailleur 28. Thus, in view of the fact that the front derailleur 28 in this embodiment uses the same actuator unit 60 that is used with the shift assisting apparatus 30, as discussed above, the operations and descriptions of the parts of the actuator unit 60 (i.e., the motor 72 and the drive train 74) will not be repeated for the sake of brevity.

Referring to FIG. 33, the motor 72 of the actuator unit 60 is electrically connected by the electrical cord 36 to the shift control unit 32 which has a microcomputer 80 with a motor driver circuit 82. As mentioned above, the position detecting circuit 84 is operatively coupled to the central processing unit of the microcomputer 80 and/or the motor driver circuit 82 for stopping the motor 72. In this embodiment, the position control device or switch detects the position of drive axle 95 of the gear drive train 74 to send a signal to stop the motor 72.

Alternatively, as seen in FIGS. 9 and 34, the position detecting circuit 84 can be replaced with an overcurrent detecting circuit 84' is operatively coupled the central processing unit of the microcomputer 80 and/or the motor driver circuit 82 for stopping the motor 72 in the same manner as discussed above.

When the position detecting circuit 84 is used, the predetermined end positions of the gear drive train 74 are detected by the position control device or switch to stop the movement of the motor 72 in the same manner as discussed above. When the overcurrent detecting circuit 84' is used, the central processing unit of the microcomputer 80, the motor driver circuit 82 and the overcurrent detecting circuit 84' operate together to stop the movement of the motor 72 upon detection of the motor 72 beginning to lock up in the same manner as discussed above.

FIGS. 35–37

Figure 35:
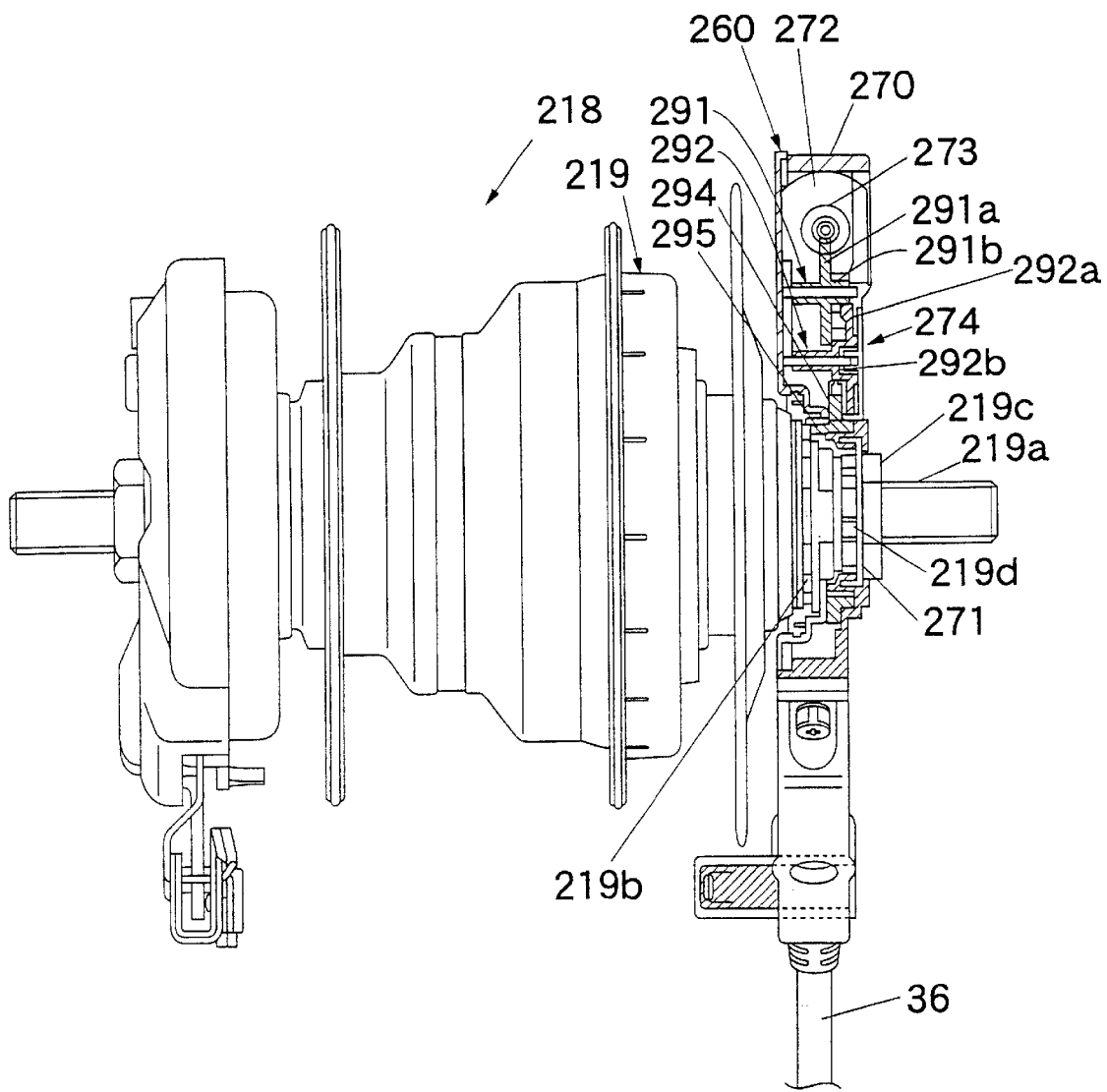
FIG. 35 is a schematic diagram illustrating a motorized internal hub being operated by a motor in accordance with another embodiment of the present invention.
Figure 36:
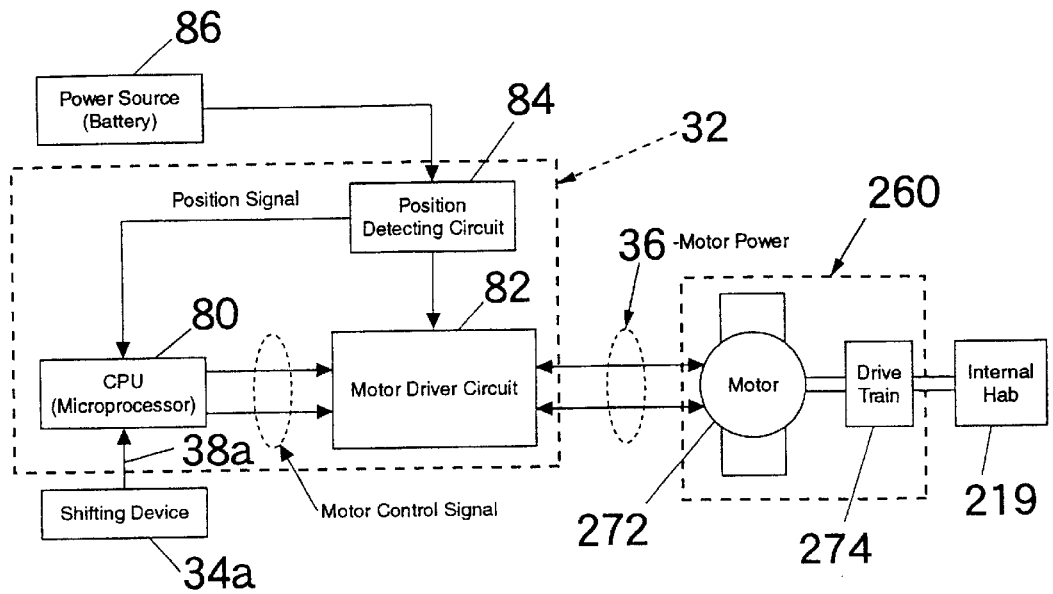
FIG. 36 is a schematic diagram illustrating the operation of the motor of the internal hub using a position detecting circuit.
Figure 37:
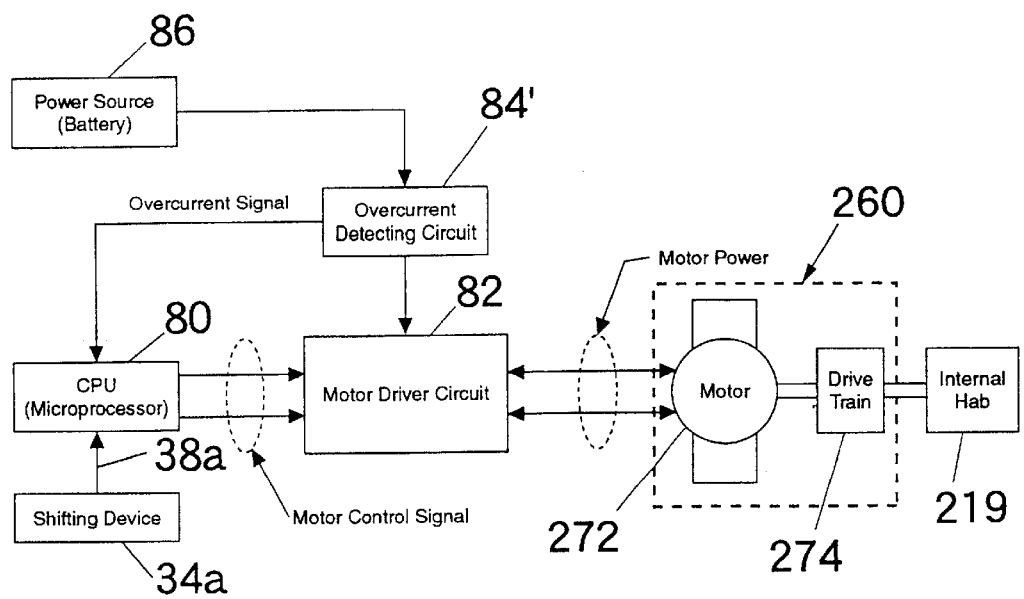
FIG. 37 is a schematic diagram illustrating the operation of the motor of the internal hub using an overcurrent detecting circuit.

Referring now to FIGS. 35–37, an alternate embodiment is illustrated in which the motorized rear derailleur assembly 18 has been replaced with an internal hub assembly 218. The internal hub assembly 218 basically includes an internal hub 219 operated by an actuator unit 260 to shift the internal hub 219 laterally relative between the various gear positions. The internal hub 219 is preferably a conventional internal hub 219. The internal hub 219 is a conventional component that is well known in the art. Since internal hubs are well known in the art, the construction of the internal hub 219 will not be discussed or illustrated in detail herein.

Referring to FIG. 35, the actuator unit 260 has a housing 270 with a motor 272 and a drive train 274 that are operatively coupled to the internal hub 219 to shift the internal hub 219. The housing 270 is mounted on the axle 219*a* of the internal hub 219 with the drive train 274 operatively coupled to a rotatable clutch actuator 219*b*. The actuator unit 260 is retained on the axle 219*a* of the internal hub 219 by a nut 219*c* that presses against a mounting flange 271 of the housing 270 which in turn presses against a hub nut 219*d* that holds the components of the internal hub 219 together.

The motor 272 and the drive train 274 are substantially identical to and the motor 72 and the drive train 74, respectively, except that the motor 272 and the drive train 274 have been adapted to operate the internal hub 219 instead of the shift assisting apparatus 30. Thus, in view of the fact that the internal hub 219 and the shift assisting apparatus 30 both used basically the same actuator unit using substantially the same motor and substantially the same drive train with shock absorbing elements, the operations and descriptions of the parts of the actuator unit 260 will be omitted for the sake of brevity. Moreover, the precise structure of internal hub 219 is not important to the present invention as well as the precise structure of the power transfer mechanism (the drive train 274) between the internal hub 219 and the motor 272. In other words, it will be apparent to those skilled in the art that the present invention can be used in any motor that operates an internal hub.

Still referring to FIG. 35, the motor 272 and the drive train 274 are disposed within the housing 270. The motor 272 has an output shaft with an output gear 273 that engages the drive train 274, which in turn engages the rotatable clutch actuator 219*b* of the internal hub 219. The drive train 274 includes two power transfer gears 291 and 292, a drive gear 294 and a drive axle 295 that transmits the rotation from the output gear 273 to the internal hub 219. More specifically, the power transfer gear 291 has a large diameter gear portion 291*a* that is rotatably engaged with the output gear 273 of the motor 272. The power transfer gear 291 also has a small diameter gear portion 291*b* that is rotatably engaged with a large diameter gear portion 292*a* of the power transfer gear 292. The power transfer gear 292 also has a small diameter gear portion 292*b* that is rotatably engaged with the drive gear 294 which has a large diameter. Thus, the drive train 274 form a gear reduction unit so that the drive gear 294 rotate at a slower rate then the output gear 273.

The drive gear 294 and the drive axle 295 have a small amount of rotational play therebetween similar to the drive gear 94 and the drive axle 95 shown in FIG. 19. This rotational play is taken up by a torsion spring (not shown) that is coupled between the drive gear 294 and the drive axle 295 in the same manner as the torsion spring 98 that is coupled between the drive gear 94 and the drive axle 95. This arrangement is designed to further protect the gears from breaking when the motor 272 locks up but the energy to the motor 272 has not been discontinued. Moreover, since the gears of the drive train 274 cannot stop immediately due to inertia, the torsion spring further protects the gears of the drive train 274 from breaking due to such an overrun. This torsion spring also protects the gears of the drive train 274 in the case of a double shift when the rider performs a second shift before the first shift is completed. The drive axle 295 has a center bore that is coupled to the rotatable clutch actuator 219*b*. The drive gear 294 is a fan-shaped gear having a hub portion mounted on the drive axle 295 and an arc shaped portion with a plurality of teeth located between first and second contact surfaces.

In the embodiment, a pair of shock absorbing elements or bumpers arranged adjacent the drive gear 294 in the same manner as in the motor 70. More specifically, the shock absorbing elements are located on the housing 270 so as to engage the first and second contact surfaces of the drive gear 294. The drive gear 294 only engages the shock absorbing elements when the motor 272 is energized to the normal stop positions of the drive axle 295.

Turning now to FIG. 36, the electronic control system 31, discussed above, is now used to operate the actuator unit 260, which in turn operates the internal hub 219. More specifically, the actuator unit 260 operates the motor 272 such that the rotational force of the motor 272 shifts the internal hub 219 via the drive train 274. The motorized actuator unit 260 is operatively coupled to the shift control unit 32 via the electrical control cord 36 and to the shifting device 34*a* via the electrical cord 38*a* for receiving the upshift and downshift signals. In other words, the motor 272 of the actuator unit 260 is electrically connected by the electrical cord 36 to the shift control unit 32 which has a microcomputer 80 with a motor driver circuit 82. As mentioned above, the position detecting circuit 84 is operatively coupled to the central processing unit of the microcomputer 80 and/or the motor driver circuit 82 for stopping the motor 272. In this embodiment, the position control device or switch detects the position of drive axle 295 of the gear drive train 274 to send a signal to stop the motor 272. Alternatively, as seen in FIGS. 9 and 37, the position detecting circuit 84 can be replaced with an overcurrent detecting circuit 84' is operatively coupled the central processing unit of the microcomputer 80 and/or the motor driver circuit 82 for stopping the motor 272 in the same manner as the motor 72.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments are provided for illustration only, and not for the purpose of limiting the invention as defined by the appended claims and their equivalents. For example, the size, shape, location or orientation of the various components may be changed as desired. The functions of one element may be performed by two, and vice versa. It is not necessary for all advantages to be present in a particular embodiment at the same time. Every feature that is unique from the prior art, alone or in combination with other features, should be considered a separate inventions by the applicant, including the structural and/or functional concepts embodied by such feature(s). Thus, the scope of the invention is not limited to the disclosed embodiments.

What is claimed is:

1. A motorized bicycle actuator assembly comprising:

a motorized actuator unit including a motor, a drive train operatively coupled to said motor to rotate a drive axle of said drive train in a first rotational direction, and a control device operatively coupled to said motor to stop rotation of said drive axle of said drive train at a first stop position; and a first shock absorbing element operatively arranged to cushion movement of said drive train when said drive axle reaches said first stop position of said drive axle, said drive train including a drive gear configured and arranged to pivot about a pivot axis through a pivot range less than 360°, said drive gear including a stop surface configured and arranged to selectively contact a complementary abutment to prevent complete rotation of said drive gear about the pivot axis with said first shock absorbing element being disposed between said stop surface and said complementary abutment.

2. The motorized bicycle actuator assembly according to claim 1, wherein said motor is a reversible motor that is operatively coupled to said drive train to rotate said drive axle of said drive train in a second rotational direction.

3. The motorized bicycle actuator assembly according to claim 2, wherein said control device is further operatively coupled to said reversible motor to stop rotation of said drive axle of said drive train at a second stop position; and said drive train being arranged to engage a second shock absorbing element operatively arranged to cushion movement of said drive train when said drive axle reaches said second stop position of said drive axle.

4. The motorized bicycle actuator assembly according to claim 3, wherein said second shock absorbing element is arranged between said drive train and a housing of said motorized actuator unit.

5. The motorized bicycle actuator assembly according to claim 4, wherein said first and second shock absorbing elements are mounted on said drive train.

6. The motorized bicycle actuator assembly according to claim 5, wherein said drive train includes a plurality of gears with said drive gear being mounted on said drive axle.

7. The motorized bicycle actuator assembly according to claim 1, wherein said control device includes a position switch device operatively coupled to said motor to stop said motor upon said drive train reaching said first stop position.

8. The motorized bicycle actuator assembly according to claim 7, wherein said position switch device is arranged to detect movement of said drive gear with said drive gear being mounted on said drive axle.

9. A motorized bicycle actuator assembly comprising:

a motorized actuator unit including a reversible motor, a drive train operatively coupled to said motor to rotate a drive axle of said drive train in a first rotational direction and a second rotational direction, and a control device operatively coupled to said motor to stop rotation of said drive axle of said drive train at a first stop position; and a first shock absorbing element operatively arranged to cushion movement of said drive train when said drive axle reaches said first stop position of said drive axle, said drive train further having a first portion coupled to said reversible motor and a second portion coupled to said drive axle with rotational play formed between said first and second portions, and a spring operatively coupled between said first and second portions to take up said rotational play such that rotation of said drive train in said first rotational direction is directly transferred between said first and second portions of said drive train and rotation of said drive train in said second rotational direction is transferred between said first and second portions of said drive train through said spring.

10. A motorized bicycle actuator assembly comprising:
a motorized actuator unit including a reversible motor, a drive train operatively coupled to said motor to rotate a drive axle of said drive train in a first rotational direction and a second rotational direction, and a control device operatively coupled to said motor to stop rotation of said drive axle of said drive train at a first stop position and a second stop position;
a first shock absorbing element operatively arranged to cushion movement of said drive train when said drive axle reaches said first stop position of said drive axle; and
a second shock absorbing element operatively arranged to cushion movement of said drive train when said drive axle reaches said second stop position of said drive axle, said first and second shock absorbing elements being arranged between said drive train and a housing of said motorized actuator unit,
said first shock absorbing element being mounted on a first stop of said housing of said motorized actuator unit and said second shock absorbing element being mounted on a second stop of said housing of said motorized actuator unit.

11. A motorized bicycle actuator assembly comprising:
a motorized actuator unit including a reversible motor, a drive train operatively coupled to said motor to rotate a drive axle of said drive train in a first rotational direction and a second rotational direction, and a control device operatively coupled to said motor to stop rotation of said drive axle of said drive train at a first stop position and a second stop position;
a first shock absorbing element operatively arranged to cushion movement of said drive train when said drive axle reaches said first stop position of said drive axle; and
a second shock absorbing element operatively arranged to cushion movement of said drive train when said drive axle reaches said second stop position of said drive axle,
said first and second shock absorbing elements being arranged between said drive train and a housing of said motorized actuator unit, said first and second shock absorbing elements being mounted on at least one of said drive train and said housing,
said drive train including a plurality of gears with a drive gear mounted on said drive axle, said drive gear being a fan-shaped gear having a hub portion mounted on said drive axle and an arc shaped portion with a plurality of teeth located between first and second contact surfaces.

12. The motorized bicycle actuator assembly according to claim 11, wherein
said first and second shock absorbing elements are located between said housing of said motorized actuator unit and said first and second contact surfaces of said drive gear.

13. The motorized bicycle actuator assembly according to claim 12, wherein
said first and second shock absorbing elements are mounted on first and second stops of said housing of said motorized actuator unit, respectively.

14. The motorized bicycle actuator assembly according to claim 12, wherein
said first and second shock absorbing elements are mounted on said first and second contact surfaces of said drive gear, respectively.

15. The motorized bicycle actuator assembly according to claim 12, further comprising
a bicycle component operatively coupled to said drive axle to move a movable member to a first preset component position that corresponds to said first stop position of said drive axle.

16. The motorized bicycle actuator assembly according to claim 15, wherein
said bicycle component is a front derailleur.

17. The motorized bicycle actuator assembly according to claim 15, wherein
said bicycle component is a rear derailleur.

18. The motorized bicycle actuator assembly according to claim 15, wherein
said bicycle component is a chain shifting device.

19. The motorized bicycle actuator assembly according to claim 15, wherein
said bicycle component is an internal hub.

20. A motorized bicycle actuator assembly comprising:
a motorized actuator unit including a motor, a drive train operatively coupled to said motor to rotate a drive axle of said drive train in a first rotational direction, and a control device operatively coupled to said motor to stop rotation of said drive axle of said drive train at a first stop position; and
a first shock absorbing element operatively arranged to cushion movement of said drive train when said drive axle reaches said first stop position of said drive axle,
said control device including an overcurrent detecting circuit operatively coupled to said motor to stop said motor upon said drive train reaching said first stop position due to detection of an overcurrent in said motor.

21. A motorized bicycle actuator assembly comprising:
a motorized actuator unit including a reversible motor, a drive train operatively coupled to said reversible motor, and a control device operatively coupled to said reversible motor to stop rotation of a drive axle of said drive train at first and second stop positions;
a bicycle component operatively coupled to said drive axle to move a movable member between a first preset component position and a second preset component position that correspond to said first and second stop positions of said drive axle, respectively; and
at least one shock absorbing element operatively arranged to cushion movement of said drive train when said drive axle reaches at least one of said first and second stop positions of said drive axle,
said drive train including a drive gear configured and arranged to pivot about a pivot axis through a pivot range less than 360°, said drive gear including a stop surface configured and arranged to selectively contact a complementary abutment to prevent complete rotation of said drive gear about the pivot axis with said at least one shock absorbing element being disposed between said stop surface and said complementary abutment.

22. The motorized bicycle actuator assembly according to claim 21, wherein
said control device includes a position switch device operatively coupled to said reversible motor to stop said reversible motor upon said drive train reaching one of said first stop position and said second stop position.

23. The motorized bicycle actuator assembly according to claim 21, wherein
said at least one shock absorbing element is mounted on said drive train.

24. The motorized bicycle actuator assembly according to claim 23, wherein
said drive train includes a plurality of gears with said drive gear being mounted on said drive axle.

25. The motorized bicycle actuator assembly according to claim 21, wherein
said bicycle component is a front derailleur.

26. The motorized bicycle actuator assembly according to claim 21, wherein
said bicycle component is a rear derailleur.

27. The motorized bicycle actuator assembly according to claim 21, wherein
said bicycle component is a chain shifting device.

28. The motorized bicycle actuator assembly according to claim 21, wherein
said bicycle component is an internal hub.

29. The motorized bicycle actuator assembly according to claim 21, wherein
said control device includes a position switch device operatively coupled to said motor to stop said motor upon said drive train reaching said first stop position.

30. A motorized bicycle actuator assembly comprising:
a motorized actuator unit including a reversible motor, a drive train operatively coupled to said reversible motor, and a control device operatively coupled to said reversible motor to stop rotation of a drive axle of said drive train at first and second stop positions;
a bicycle component operatively coupled to said drive axle to move a movable member between a first preset component position and a second preset component position that correspond to said first and second stop positions of said drive axle, respectively; and
at least one shock absorbing element operatively arranged to cushion movement of said drive train when said drive axle reaches at least one of said first and second stop positions of said drive axle,
said control device including a position switch device operatively coupled to said reversible motor to stop said reversible motor upon said drive train reaching one of said first stop position and said second stop position,
said position switch device being arranged to detect movement of a drive gear mounted on said drive axle.

31. A motorized bicycle actuator assembly comprising:
a motorized actuator unit including a reversible motor, a drive train operatively coupled to said reversible motor, and a control device operatively coupled to said reversible motor to stop rotation of a drive axle of said drive train at first and second stop positions;
a bicycle component operatively coupled to said drive axle to move a movable member between a first preset component position and a second preset component position that correspond to said first and second stop positions of said drive axle, respectively; and
at least one shock absorbing element operatively arranged to cushion movement of said drive train when said drive axle reaches at least one of said first and second stop positions of said drive axle,
said at least one shock absorbing element including a first shock absorbing element mounted on a first stop of a housing of said motorized actuator unit and a second shock absorbing element mounted on a second stop of said housing of said motorized actuator unit.

32. A motorized bicycle actuator assembly comprising:
a motorized actuator unit including a reversible motor, a drive train operatively coupled to said reversible motor, and a control device operatively coupled to said reversible motor to stop rotation of a drive axle of said drive train at first and second stop positions;
a bicycle component operatively coupled to said drive axle to move a movable member between a first preset component position and a second preset component position that correspond to said first and second stop positions of said drive axle, respectively; and
at least one shock absorbing element operatively arranged to cushion movement of said drive train when said drive axle reaches at least one of said first and second stop positions of said drive axle,
said at least one shock absorbing element being mounted on at least one of said drive train and a housing of said motorized actuator unit,
said drive train including a plurality of gears with a drive gear mounted on said drive axle,
said drive gear being a fan-shaped gear having a hub portion mounted on said drive axle and an arc shaped portion with a plurality of teeth located between first and second contact surfaces.

33. The motorized bicycle actuator assembly according to claim 32, wherein
said at least one shock absorbing element is located between said housing of said motorized actuator unit and at least one of said first and second contact surfaces of said drive gear.

34. The motorized bicycle actuator assembly according to claim 33, wherein
said at least one shock absorbing element is mounted on at least one of first and second stops of said housing of said motorized actuator unit.

35. The motorized bicycle actuator assembly according to claim 33, wherein
said at least one shock absorbing element is mounted on at least one of said first and second contact surfaces of said drive gear.

36. A motorized bicycle actuator assembly comprising:
a motorized actuator unit including a reversible motor, a drive train operatively coupled to said reversible motor, and a control device operatively coupled to said reversible motor to stop rotation of a drive axle of said drive train at first and second stop positions;
a bicycle component operatively coupled to said drive axle to move a movable member between a first preset component position and a second preset component position that correspond to said first and second stop positions of said drive axle, respectively; and
at least one shock absorbing element operatively arranged to cushion movement of said drive train when said drive axle reaches at least one of said first and second stop positions of said drive axle,
said control device including a position switch device operatively coupled to said motor to stop said motor upon said drive train reaching said first stop position,
said position switch device being arranged to detect movement of a drive gear mounted on said drive axle.

* * * * *